US007653474B2

(12) United States Patent  (10) Patent No.: US 7,653,474 B2
Cawthorne et al.  (45) Date of Patent: Jan. 26, 2010

(54) METHOD OF DETERMINING ENGINE OUTPUT POWER IN A HYBRID ELECTRIC VEHICLE

(75) Inventors: William R. Cawthorne, Milford, MI (US); Gregory A. Hubbard, Brighton, MI (US)

(73) Assignee: GM Global Technology Operations, Inc., Detroit, MI (US)

(*) Notice: Subject to any disclaimer, the term of this patent is extended or adjusted under 35 U.S.C. 154(b) by 884 days.

(21) Appl. No.: 10/846,141

(22) Filed: May 14, 2004

(65) Prior Publication Data

US 2005/0256631 A1  Nov. 17, 2005

(51) Int. Cl.
*G06F 19/00* (2006.01)
*G06F 17/00* (2006.01)
(52) U.S. Cl. ............... 701/99; 701/101; 701/22; 903/903; 180/65.27; 180/65.28; 340/441; 123/406.12
(58) Field of Classification Search .......... 701/99, 701/22; 180/65.1, 65.2, 65.3, 65.27–65.28, 180/2.85; 318/139; 477/3, 7; 60/298; 340/441; 903/903, 905, 906, 908
See application file for complete search history.

(56) References Cited

U.S. PATENT DOCUMENTS

| 5,931,757 | A | 8/1999 | Schmidt |
| 6,600,414 | B2* | 7/2003 | Foo et al. .................. 340/440 |
| 6,784,565 | B2* | 8/2004 | Wall et al. .................. 290/52 |
| 6,812,586 | B2* | 11/2004 | Wacknov et al. ............ 290/52 |
| 6,832,148 | B1* | 12/2004 | Bennett et al. .............. 701/54 |
| 7,110,867 | B2* | 9/2006 | Imazu ...................... 701/22 |
| 7,127,337 | B2* | 10/2006 | Bennett et al. .............. 701/22 |
| 2001/0039230 | A1* | 11/2001 | Severinsky et al. .......... 477/3 |
| 2002/0062183 | A1* | 5/2002 | Yamaguchi et al. .......... 701/22 |
| 2002/0175522 | A1* | 11/2002 | Wacknov et al. ............ 290/52 |
| 2002/0177504 | A1* | 11/2002 | Pels et al. ................... 477/3 |

(Continued)

FOREIGN PATENT DOCUMENTS

DE  69327072 T2  7/2000

(Continued)

OTHER PUBLICATIONS

Sliding mode based powertrain control for efficiency improvement in series hybrid-electric vehicles; Gokasan, M.; Bogosyan, S.; Goering, D.J.; Power Electronics, IEEE Transactions on; vol. 21, Issue 3, May 2006 pp. 779-790; Digital Object Identifier 10.1109/TPEL.2006.872373.*

(Continued)

*Primary Examiner*—Cuong H Nguyen

(57) ABSTRACT

This novel silent operating mode for a hybrid electric vehicle (HEV) reduces noise and emissions compared to traditional HEV operating modes. It is a complementary series of software control functions that allows the vehicle to operate with reduced noise and emissions where specifically needed, while phasing-in engine power where allowed. The method utilizes an energy storage system budget associated with a modal quantity of energy allocated for the mode, and is adapted to automatically adjust the operation of the vehicle to accommodate deviations from the budgeted energy amount. The method which implements the mode also adjusts the vehicle operation in conjunction with changes in the parametric conditions of the ESS, including the selective use of the engine output power. In particular, the silent operating mode comprises a method of selecting an engine output power from a speed-based engine output power and a grade-based engine output power. The grade-based engine output power may be determined from a plurality of vehicle state parameters.

24 Claims, 12 Drawing Sheets

U.S. PATENT DOCUMENTS

| | | | | |
|---|---|---|---|---|
| 2002/0190695 | A1* | 12/2002 | Wall et al. | 322/17 |
| 2003/0074115 | A1* | 4/2003 | Yamaguchi et al. | 701/22 |
| 2004/0044448 | A1* | 3/2004 | Ramaswamy et al. | 701/22 |
| 2005/0080523 | A1* | 4/2005 | Bennett et al. | 701/22 |
| 2005/0256631 | A1* | 11/2005 | Cawthorne et al. | 701/99 |

FOREIGN PATENT DOCUMENTS

EP  0570234 B1  5/1993

OTHER PUBLICATIONS

The State of the Art of Electric, Hybrid, and Fuel Cell Vehicles; Chan, C.C.; Proceedings of the IEEE; vol. 95, Issue 4, Apr. 2007 pp. 704 - 718; Digital Object Identifier 10.1109/JPROC.2007.892489.*

Analysis and control of a flywheel hybrid vehicular powertrain; Shen, S.; Veldpaus, F.E.; Control Systems Technology, IEEE Transactions on; vol. 12, Issue 5, Sep. 2004 pp. 645-660; Digital Object Identifier 10.1109/TCST.2004.824792.*

Intelligent energy management agent for a parallel hybrid vehicle-part II: torque distribution, charge sustenance strategies, and performance results; Jong-Seob Won; Langari, R.; Vehicular Technology, IEEE Transactions on; vol. 54, Issue 3, May 2005 pp. 935-953; Digital Object Identifier 10.1109/TVT.2005.844683.*

Control Strategies for Hybrid Electric Vehicles: Evolution, Classification, Comparison, and Future Trends; Salmasi, F.R.; Vehicular Technology, IEEE Transactions on; vol. 56, Issue 5, Part 1, Sep. 2007 pp. 2393-2404 Digital Object Identifier 10.1109/TVT.2007.899933.*

New type of permanent magnet synchronous motors for parallel hybrid electric vehicle; Yinghai Wang; Zhengming Li; Service Operations, Logistics and Informatics, 2009. SOLI '09. IEEE/INFORMS International Conference on Jul. 22-24, 2009 pp. 687-692; Digital Object Identifier 10.1109/SOLI.2009.5204020.*

Performance comparison of hybrid vehicle energy management controllers on real-world drive cycle data; Opila, D.F.; Xiaoyong Wang; McGee, R.; Cook, J.A.; Grizzle, J.W.; American Control Conference, 2009. ACC '09.; Jun. 10-12, 2009 pp. 4618-4625; Digital Object Identifier 10.1109/ACC.2009.5160503.*

Research on the fuel quantity control for common rail diesel engine in the hybrid electric vehicles working on the low-load area; Sun Shuai; Zhang Youtong; Industrial Electronics and Applications, 2009. ICIEA 2009. 4th IEEE Conference on May 25-27, 2009 pp. 440-444; Digital Object Identifier 10.1109/ICIEA.2009.5138244.*

* cited by examiner

| Condition | Latch | Unlatch | Previous Value | Output |
|---|---|---|---|---|
| 0 | 0 | 0 | 0 | 0 |
| 1 | 0 | 0 | 1 | 1 |
| 2 | 0 | 1 | 0 | 0 |
| 3 | 0 | 1 | 1 | 0 |
| 4 | 1 | 0 | 0 | 1 |
| 5 | 1 | 0 | 1 | 1 |
| 6 | 1 | 1 | 0 | 0 |
| 7 | 1 | 1 | 1 | 0 |

METHOD OF DETERMINING ENGINE OUTPUT POWER IN A HYBRID ELECTRIC VEHICLE

TECHNICAL FIELD

The present invention is generally related to the control of the output power of an internal combustion engine. The invention is more particularly related to the control of the output power of an internal combustion engine of a hybrid electric vehicle, and is most particularly related to a hybrid electric vehicle adapted for operation in a silent mode for reduced vehicle emissions.

BACKGROUND OF THE INVENTION

An HEV is a vehicle that has a propulsion system that consists of at least one electric motor or electric machine in combination with at least one other power source. Typically, the other power source is a gasoline or diesel engine. There are various types of HEVs depending on how the electric motor(s) and other power source(s) are combined with one another in order to provide propulsion for the vehicle, including series, parallel and compound HEVs, including those having electrically variable transmissions (EVTs) which provide for continuously variable speed ratios by combining features from both series and parallel HEV powertrain architectures.

The development of new HEV powertrain architectures also facilitate the development and implementation of novel vehicle operating methodologies that utilize the novel features available in these systems. New operating methods are desired that utilize HEV powertrain architectures, for example, to provide vehicle operating methodologies that are particularly adapted to their operating environments, or that meet legal, regulatory or other constraints that are imposed upon their operating enviroments, such as by using novel combinations of electrical and mechanical propulsion energy to minimze vehicle emisssions, such as noise and exhaust emissions. It is also desirable that such operating methodologies are incorporated into the vehicle hardware and software systems as novel operating modes that are available for selection manually by an operator, or for automatic implementation by the vehicle in response to predetermined conditions.

Complex EVT HEVs utilize one or more electric machines and require advanced, high energy density, energy storage systems (ESS) which include batteries, ultracapacitors or combinations thereof, to supply electrical energy to and receive and store electrical energy from these machines. The implementation of new operating methodologies, place increased demands on the electric machines and ESS associated with the dynamic flow of power into and out of the ESS.

Therefore, it is highly desirable to develop vehicle operating methodologies that are adapted to vehicle operating environment requirements and that can be incorporated into the vehicles as operating modes that implement advance control of HEV systems, including the engine, electric machine and ESS systems. It is particularly desirable to implement a silent or hush mode whereby the electric machine is used preferentially to power the vehicle and the engine output power is generally limited to a value that is less than the maximum engine output power.

SUMMARY OF THE INVENTION

The present invention is a method of determining an engine output power for a vehicle which includes determining a grade-based engine output power for the vehicle; determining a speed-based engine output power, wherein a speed-based engine output power is determined as a function of a speed of the vehicle; and selecting the output power of the engine from the grade-based engine output power and the speed-based engine output power. The grade-based engine output power is determined as a function of one or more vehicle state parameters.

The method preferably includes a precharging step to establish a desired modal quantity of battery energy for use in implementing the method.

The method also preferably utilizes a battery budget to distribute the modal quantity of battery energy allocated for implementation of the silent mode over the length of the target zone in which the mode is to be implemented. The method also preferably utilizes a method of controlling the battery budget using a battery budget factor, which compares the budgeted battery use with actual battery use in order to determine when additional propulsion energy is required from the engine.

This method provides significant and readily appreciable advantages and benefits associated with a substantial reduction of both noise and exhaust emissions within the target zone of its use. It is also advantageous by providing additional grade-based engine output power when a grade is detected which could otherwise reduce vehicle performance while operating in the silent mode.

BRIEF DESCRIPTION OF THE DRAWINGS

The present invention will be more fully understood from the accompanying drawings, in which.

DESCRIPTION OF THE PREFERRED EMBODIMENT

Figure 1:
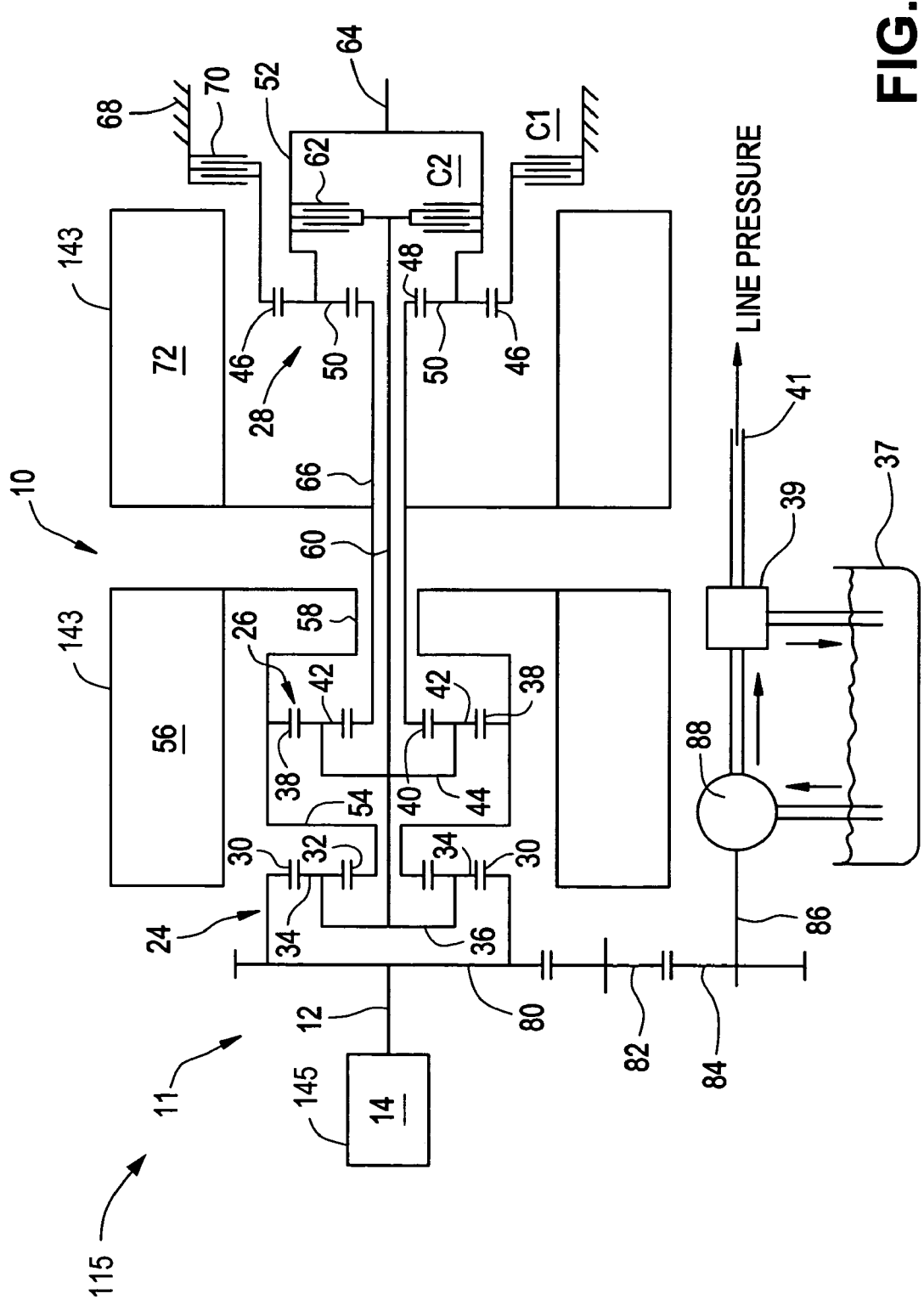
FIG. 1 is a mechanical hardware schematic representation of one preferred form of a two-mode, compound-split, electrically variable transmission particularly suited to the implementation of the present invention.
Figure 2:
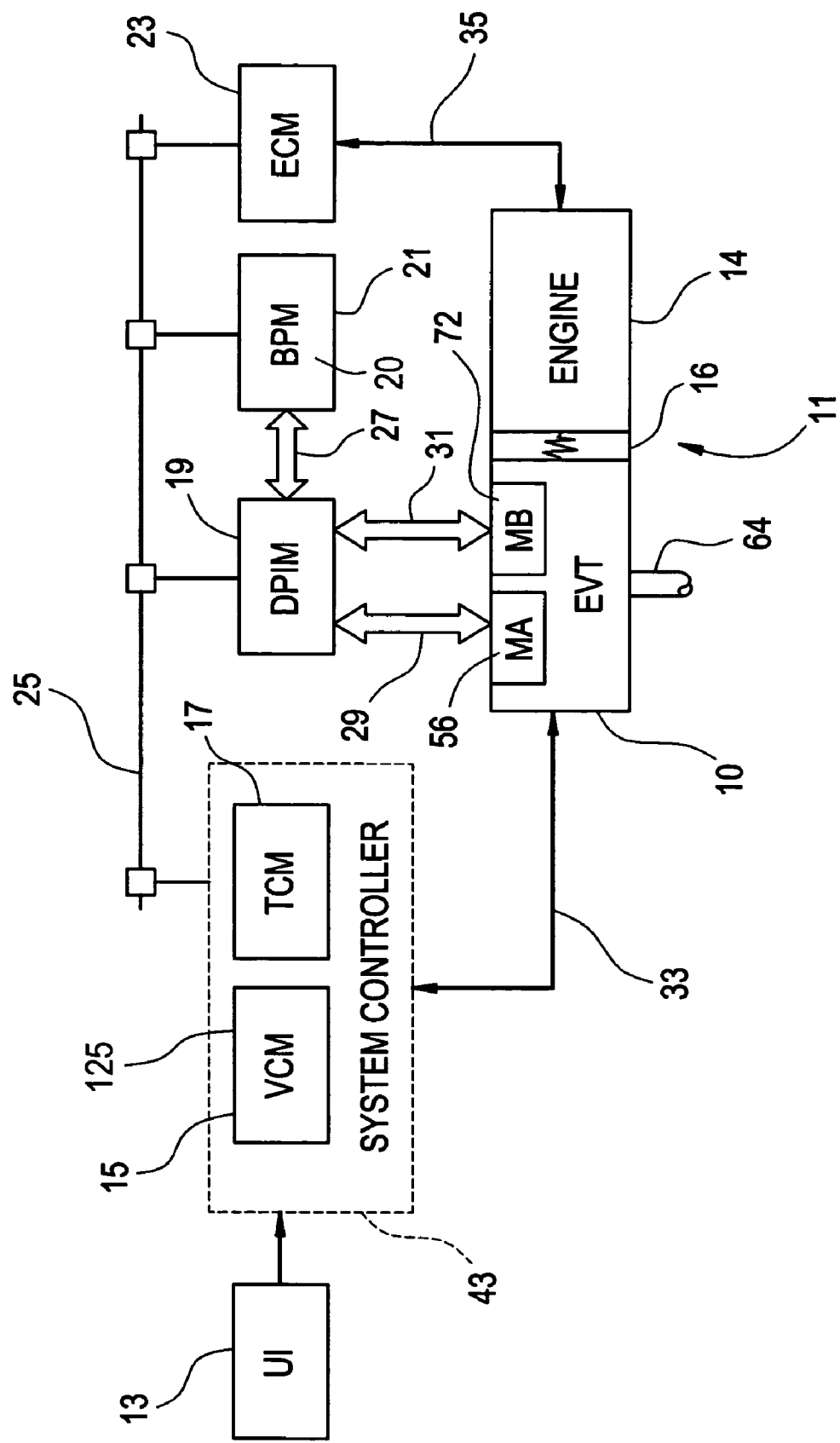
FIG. 2 is an electrical and mechanical schematic of a preferred system architecture for the hybrid powertrain disclosed herein.

With reference first to FIGS. 1 and 2, a vehicular powertrain is generally designated 11. Included in the powertrain 11 is one representative form of a multi-mode, compound-split, electrically variable transmission (EVT) particularly suited for implementing the controls of the present invention and designated generally by the numeral 10 in FIGS. 1 and 2. With particular reference, then, to those figures, the EVT 10 has an input member 12 that may be in the nature of a shaft which may be directly driven by an engine 14 or, as shown in FIG. 2, a transient torque damper 16 may be incorporated between the output member of the engine 14 and the input member of the EVT 10. The transient torque damper 16 may incorporate, or be employed in conjunction with, a torque transfer device (not shown) to permit selective engagement of the engine 14 with the EVT 10, but it must be understood that such a torque transfer device is not utilized to change, or control, the mode in which the EVT 10 operates.

In the embodiment depicted, the engine 14 may be a fossil fuel engine, such as a diesel engine which is readily adapted to provide its available power output delivered at a constant number of revolutions per minute (RPM). In the exemplary embodiment to which FIGS. 1 and 2 are directed, the engine 14 can—after start-up, and during the majority of its input—operate at a constant speed or at a variety of constant speeds in accordance with a desired operating point as may be determined from operator inputs and driving conditions.

The EVT 10 utilizes three planetary gear subsets 24, 26 and 28. The first planetary gear subset 24 has an outer gear member 30, that may generally be designated as the ring gear, which circumscribes an inner gear member 32, generally designated as the sun gear. A plurality of planet gear members 34 are rotatably mounted on a carrier 36 such that each planet gear member 34 meshingly engages both the outer gear member 30 and the inner gear member 32.

The second planetary gear subset 26 also has an outer gear member 38, generally designated as the ring gear, which circumscribes an inner gear member 40, generally designated as the sun gear. A plurality of planet gear members 42 are rotatably mounted on a carrier 44 such that each planet gear 42 meshingly engages both the outer gear member 38 and the inner gear member 40.

The third planetary gear subset 28 also has an outer gear member 46, generally designated as the ring gear, which circumscribes an inner gear member 48, generally designated as the sun gear. A plurality of planet gear members 50 are rotatably mounted on a carrier 52 such that each planet gear 50 meshingly engages both the outer gear member 46 and the inner gear member 48.

While all three planetary gear subsets 24, 26 and 28 are "simple" planetary gear subsets in their own right, the first and second planetary gear subsets 24 and 26 are compounded in that the inner gear member 32 of the first planetary gear subset 24 is conjoined, as through a hub plate gear 54, to the outer gear member 38 of the second planetary gear subset 26. The conjoined inner gear member 32 of the first planetary gear subset 24 and the outer gear member 38 of the second planetary gear subset 26 are continuously connected to a first motor/generator 56, as by a sleeve shaft 58. First motor/generator 56 may also be referred to herein variously as motor A or $M_A$.

The planetary gear subsets 24 and 26 are further compounded in that the carrier 36 of the first planetary gear subset 24 is conjoined, as through a shaft 60, to the carrier 44 of the second planetary gear subset 26. As such, carriers 36 and 44 of the first and second planetary gear subsets 24 and 26, respectively, are conjoined. The shaft 60 is also selectively connected to the carrier 52 of the third planetary gear subset 28, as through a torque transfer device 62 which, as will be hereinafter more fully explained, is employed to assist in the selection of the operational modes of the EVT 10. Torque transfer device 62 may also be referred to herein variously as second clutch, clutch two or C2.

The carrier 32 of the third planetary gear subset 28 is connected directly to the transmission output member 64. When the EVT 10 is used in a land vehicle, the output member 64 may be connected to the vehicular axles (not shown) that may, in turn, terminate in the drive members (also not shown). The drive members may be either front or rear wheels of the vehicle on which they are employed, or they may be the drive gear of a track vehicle.

The inner gear member 40 of the second planetary gear subset 26 is connected to the inner gear member 48 of the third planetary gear subset 28, as through a sleeve shaft 66 that circumscribes shaft 60. The outer gear member 46 of the third planetary gear subset 28 is selectively connected to ground, represented by the transmission housing 68, through a torque transfer device 70. Torque transfer device 70, as is also hereinafter explained, is also employed to assist in the selection of the operational modes of the EVT 10. Torque transfer device 70 may also be referred to herein variously as first clutch, clutch one or C1.

The sleeve shaft 66 is also continuously connected to a second motor/generator 72. Second motor/generator 72 may also be referred to herein variously as motor B or MB. All the planetary gear subsets 24, 26 and 28 as well as motor A and motor B (56, 72) are coaxially oriented, as about the axially disposed shaft 60. It should be noted that both motors A and B are of an annular configuration which permits them to circumscribe the three planetary gear subsets 24, 26 and 28 such that the planetary gear subsets 24, 26 and 28 are disposed radially inwardly of the motors A and B. This configuration assures that the overall envelope—i.e., the circumferential dimension—of the EVT 10 is minimized.

A drive gear 80 may be presented from the input member 12. As depicted, the drive gear 80 fixedly connects the input member 12 to the outer gear member 30 of the first planetary gear subset 24, and the drive gear 80, therefore, receives power from the engine 14 and/or the motor/generators 56 and/or 72. The drive gear 80 meshingly engages an idler gear 82 which, in turn, meshingly engages a transfer gear 84 that is secured to one end of a shaft 86. The other end of the shaft 86 may be secured to a transmission fluid pump and 88 which is supplied transmission fluid from sump 37, delivering high pressure fluid to regulator 39 which returns a portion of the fluid to sump 37 and provides regulated line pressure in line 41.

In the described exemplary mechanical arrangement, the output member 64 receives power through two distinct gear trains within the EVT 10. A first mode, or gear train, is selected when the first clutch C1 is actuated in order to "ground" the outer gear member 46 of the third planetary gear subset 28. A second mode, or gear train, is selected when the first clutch C1 is released and the second clutch C2 is simultaneously actuated to connect the shaft 60 to the carrier 52 of the third planetary gear subset 28.

Those skilled in the art will appreciate that the EVT 10 is capable of providing a range of output speeds from relatively slow to relatively fast within each mode of operation. This combination of two modes with a slow to fast output speed range in each mode allows the EVT 10 to propel a vehicle from a stationary condition to highway speeds. In addition, a fixed-ratio state wherein both clutches C1 and C2 are simultaneously applied is available for efficient mechanical coupling of the input member to the output member through a fixed gear ratio. Furthermore, a neutral state wherein both clutches C1 and C2 are simultaneously released is available for mechanically decoupling the output member from the transmission. Finally, the EVT 10 is capable to provide synchronized shifts between the modes wherein slip speed across both clutches C1 and C2 is substantially zero. Additional details regarding operation of the exemplary EVT can be found in commonly assigned U.S. Pat. No. 5,931,757, the contents of which are incorporated herein by reference.

Engine 14 is preferably a diesel engine and electronically controlled by engine control module 23 as illustrated in FIG. 2. ECM 23 is a conventional microprocessor based diesel engine controller comprising such common elements as microprocessor, read only memory ROM, random access memory RAM, electrically programmable read only memory EPROM, high speed clock, analog to digital (A/D) and digital to analog (D/A) circuitry, and input/output circuitry and devices (I/O) and appropriate signal conditioning and buffer circuitry. ECM 23 functions to acquire data from a variety of sensors and control a variety of actuators, respectively, of the engine 14 over a plurality of discrete lines. For simplicity, ECM 23 is shown generally in bi-directional interface with engine 14 via aggregate line 35. Among the various parameters that may be sensed by ECM 23 are oil sump and engine coolant temperatures, engine speed (Ne), turbo pressure, and ambient air temperature and pressure. Various actuators that may be controlled by the ECM 23 include fuel injectors, fan controllers, engine preheaters including glow plugs and grid-type intake air heaters. ECM preferably provides for well known torque based controls for engine 14 in response to a torque command Te_cmd provided by the EVT control system. Such engines electronics, controls and quantities are generally well known to those skilled in the art and further detailed exposition thereof is not required herein.

As should be apparent from the foregoing description the EVT 10 selectively receives power from the engine 14. As will now be explained with continued reference to FIG. 2, the EVT also receives power from an electric energy storage device or system 20 (ESS), such as one or more batteries in battery pack module (BPM) 21. As used herein, reference to a battery includes not only a single battery, also includes any combination of single or multiple batteries, or cells thereof, into a battery pack or array, or a plurality of battery packs or arrays. BPM 21 is preferably a parallel array of battery packs, each of which comprises a plurality of batteries. As used herein, the term battery generally refers to any secondary or rechargeable battery, but those comprising lead/acid, nickel/metal hydride (Ni/MH), or Li/ion or polymer cells are preferred. Other electric energy storage devices that have the ability to store electric power through charging and dispense electric power through discharging, such as super capacitors or ultracapacitors, may be used in place of, or in combination with, the batteries without altering the concepts of the present invention. The BPM 21 is high voltage DC (e.g., about 650 V in an exemplary embodiment) coupled to dual power inverter module (DPIM) 19 via DC lines 27. Current is transferable to or from the BPM 21 in accordance with whether the BPM 21 is being charged or discharged. BPM 21 also comprises a conventional microprocessor based controller comprising such common elements as microprocessor, read only memory ROM, random access memory RAM, electrically programmable read only memory EPROM, high speed clock, analog to digital (A/D) and digital to analog (D/A) circuitry, and input/output circuitry and devices (I/O), temperature sensors and appropriate signal conditioning and buffer circuitry necessary to monitor the state of the battery and transmit this information to other portions of the control system for use in the overall control of the vehicle, such as VCM 15 and TCM 17. This includes sensing, processing, calculating and otherwise monitoring various parametric information regarding the state or condition of the battery, such as its temperature, current and voltage while charging and discharging, and state of charge (SOC), which comprises the instantaneous amount of energy stored in the battery expressed as a percentage of its total energy storage capacity. This also includes is a transmitting the information concerning these parameters to other portions of the vehicle control system, including the VCM 15 and TCM 17, for use in conjunction with control algorithms which make use of battery parametric information, such as those used to establish SOC-related charge and discharge limits, amp-hour/hour or energy throughput limits, temperature limits or other battery-related control functions.

DPIM 19 includes a pair of power inverters and respective motor controllers configured to receive motor control commands and control inverter states therefrom for providing motor drive or regeneration functionality. Motor controllers are microprocessor based controllers comprising such common elements as microprocessor, read only memory ROM, random access memory RAM, electrically programmable read only memory EPROM, high speed clock, analog to digital (A/D) and digital to analog (D/A) circuitry, and input/output circuitry and devices (I/O) and appropriate signal conditioning and buffer circuitry. In motoring control, the respective inverter receives current from the DC lines and provides AC current to the respective motor over high voltage phase lines 29 and 31. In regeneration control, the respective inverter receives AC current from the motor over high voltage phase lines 29 and 31 and provides current to the DC lines 27. The net DC current provided to or from the inverters determines the charge or discharge operating mode of the BPM 21. Preferably, $M_A$ and MB are three-phase AC machines and the inverters comprise complementary three-phase power electronics. Individual motor speed signals Na and Nb for $M_A$ and $M_B$, respectively, are also derived by the DPIM 19 from the motor phase information or in conventional rotation sensors. Such motors, electronics, controls and quantities are generally well known to those skilled in the art and further detailed exposition thereof is not required herein.

System controller 43 is a microprocessor based controller comprising such common elements as microprocessor, read only memory ROM, random access memory RAM, electrically programmable read only memory EPROM, high speed clock, analog to digital (A/D) and digital to analog (D/A) circuitry, digital signal processor (DSP), and input/output circuitry and devices (I/O) and appropriate signal conditioning and buffer circuitry. In the exemplary embodiment, system controller 43 comprises a pair of microprocessor based controllers designated as vehicle control module (VCM) 15 and transmission control module (TCM) 17. VCM and TCM may provide, for example, a variety of control and diagnostic functions related to EVT and vehicle chassis including, for example, engine torque commands, input speed control, and output torque control in coordination with regenerative braking, anti-lock braking and traction control. Particularly with respect to EVT functionality, system controller 43 functions to directly acquire data from a variety of sensors and directly control a variety of actuators, respectively, of the EVT over a plurality of discrete lines. For simplicity, system controller 43 is shown generally in bi-directional interface with EVT via aggregate line 33. Of particular note, system controller 43 receives frequency signals from rotation sensors for processing into input member 12 speed Ni and output member 64 speed No for use in the control of EVT 10. System controller 43 may also receive and process pressure signals from pressure switches (not separately illustrated) for monitoring clutch C1 and C2 application chamber pressures. Alternatively, pressure transducers for wide range pressure monitoring may be employed. PWM and/or binary control signals are provided by system controller to EVT 10 for controlling fill and drain of clutches C1 and C2 for application and release thereof. Additionally, system controller 43 may receive transmission fluid sump 37 temperature data, such as from conventional thermocouple input (not separately illustrated) to derive sump temperature Ts and provide a PWM signal which may be derived from input speed Ni and sump temperature Ts for control of line pressure via regulator 39. Fill and drain of clutches C1 and C2 are effectuated by way of solenoid controlled spool valves responsive to PWM and binary control signals as alluded to above. Similarly, line pressure regulator 39 may be of a solenoid controlled variety for establishing regulated line pressure in accordance with the described PWM signal. Such line pressure controls are generally well known to those skilled in the art. Clutch slip speeds across clutches C1 and C2 are derived from output speed No, $M_A$ speed Na and $M_B$ speed Nb; specifically, C1 slip is a function of No and Nb, whereas C2 slip is a function of No, Na and Nb. Also illustrated is user interface (UI) block 13 which comprises such inputs to system controller 43 such as vehicle throttle position, push button shift selector (PBSS) for available drive range selection, brake effort and fast idle requests among others. System controller 43 determines a torque command Te_cmd and provides it to ECM 23. Torque command Te_cmd is representative of the EVT torque contribution desired from the engine as determined by the system controller.

The various modules described (i.e., system controller 43, DPIM 19, BPM 21, ECM 23) communicate via controller area network (CAN) bus 25. The CAN bus 25 allows for communication of control parameters and commands between the various modules. The specific communication protocol utilized will be application specific. For example, the preferred protocol for heavy duty applications is the Society of Automotive Engineers standard J1939. The CAN bus and appropriate protocols provide for robust messaging and multi-controller interfacing between the system controller, ECM, DPIM, BPIM and other controllers such as antilock brake and traction controllers.

Figure 3:
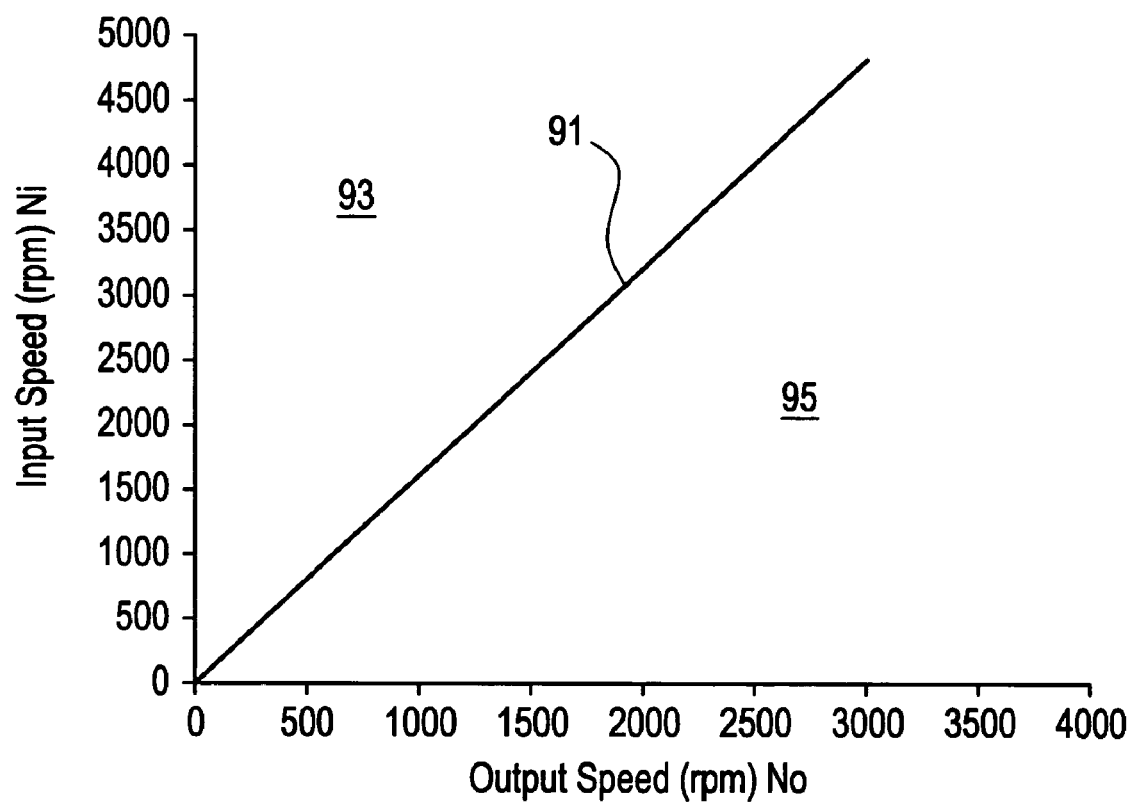
FIG. 3 is a graphical representation of various regions of operation with respect to input and output speeds of the exemplary electrically variable transmission disclosed herein.

With reference to FIG. 3, a plot of output speed No along the horizontal axis versus input speed Ni across the vertical axis for the EVT 10 is illustrated. Synchronous operation, that is the input speed and output speed relationships whereat both clutch C1 and C2 are operating simultaneously with substantially zero slip speed thereacross is represented by line 91. As such, it represents the input and output speed relationships substantially whereat synchronous shifting from between modes can occur or whereat direct mechanical coupling from input to output can be effected by simultaneous application of both clutches C1 and C2, also known as fixed-ratio. One particular gearset relationship capable of producing the synchronous operation depicted by line 91 in FIG. 3 is as follows: outer gear member 30 having 91 teeth, inner gear member 32 having 49 teeth, planet gear members 34 having 21 teeth; outer gear member 38 having 91 teeth, inner gear member 40 having 49 teeth, planet gear members 42 having 21 teeth; outer gear member 46 having 89 teeth, inner gear member 48 having 31 teeth, planet gear members 50 having 29 teeth. Line 91 may be variously referred to herein as synchronous line, shift ratio line or fixed-ratio line.

To the left of the shift ratio line 91 is a preferred region of operation 93 for the first mode wherein C1 is applied and C2 is released. To the right of the shift ratio line 91 is a preferred region of operation 95 for the second mode wherein C1 is released and C2 is applied. When used herein with respect to clutches C1 and C2, the term applied indicates substantial torque transfer capacity across the respective clutch while the term released indicates insubstantial torque transfer capacity across the respective clutch. Since it is generally preferred to cause shifts from one mode to the other to occur synchronously, torque transfers from one mode into the other mode are caused to occur through a two clutch application fixed ratio wherein, for a finite period prior to the release of the presently applied clutch, the presently released clutch is applied. And the mode change is completed when fixed-ratio is exited by the continued application of the clutch associated with the mode being entered and the release of the clutch associated with the mode being exited. While region of operation 93 is generally preferred for the operation of the EVT in MODE 1, it is not meant to imply that MODE 2 operation of the EVT cannot or does not occur therein. Generally, however, it is preferred to operate in MODE 1 in region 93 because MODE 1 preferably employs gearsets and motor hardware particularly well suited in various aspects (e.g., mass, size, cost, inertial capabilities, etc.) to the high launch torques of region 93. Similarly, while region of operation 95 is generally preferred for the operation of the EVT in MODE 2, it is not meant to imply that MODE 1 operation of the EVT cannot or does not occur therein. Generally, however, it is preferred to operate in MODE 2 in region 95 because MODE 2 preferably employs gearsets and motor hardware particularly well suited in various aspects (e.g., mass, size, cost, inertial capabilities, etc.) to the high speeds of region 95. A shift into MODE 1 is considered a downshift and is associated with a higher gear ratio in accordance with the relationship of Ni/No. Likewise, a shift into MODE 2 is considered an upshift and is associated with a lower gear ratio in accordance with the relationship of Ni/No. The present invention comprises a method 100 for implementing a silent mode 110 or HUSH mode 110 of operating an HEV 115, such as one having powertrain 11, so as to reduce noise and exhaust emissions compared to normal HEV operating modes. Further details of a silent or HUSH mode of operating an HEV may be found in related, commonly assigned, co-pending U.S. Ser. No. 10/686,175 filed on Oct. 14, 2003, which is hereby incorporated herein by reference in its entirety. While the present invention is particularly suited for use in an HEV 115 having EVT powertrain 11, it is also believed to be applicable to many other series, parallel and EVT HEV powertrain configurations, including single, double or multimode, input, output or compound split EVT configurations. The method preferably is implemented as a complementary series of software control functions or instructions in a silent mode controller 125 such as VCM 15, TCM 17, or one of the other controllers described above, that allow the vehicle to operate with reduced noise and emissions where specifically needed, while phasing-in engine power as necessary and subject to certain constraints. Applicants have implemented elements of method 100 in both VCM 15 and TCM 17, but it is believed that method 100 may also be implemented in other control modules or controllers within the vehicle in accordance with system design and other considerations. Method 100 is preferably stored and implemented in these controllers as code in a computer control algorithm, but may also be implemented in hardware using discrete logic and computational elements if desired.

Silent mode 110 is particularly applicable for use in an HEV comprising a transit bus having an EVT powertrain operating in a tunnel or other enclosed space, such as a parking garage or large building, with a plurality of passenger or other stops. Other applications could include transit buses, garbage trucks or other delivery vehicles operating (with pick-ups and drop-offs) in a noise or exhaust emission restricted region (e.g., hospital zones and certain neighborhoods). Method 100 is applicable over well-defined routes as well as undefined routes within a defined region, and may also be applicable for use where neither a route nor region is predefined, but wherein a location or region is adapted to communicate that silent mode operation is desired to a vehicle that is adapted to receive such communication and implement method 100. As used herein, a "target zone" refers to a location, area or region in which it is desired or intended that the vehicle operates in silent mode 110 so as to effect reduced noise and exhaust emissions.

Figure 4:
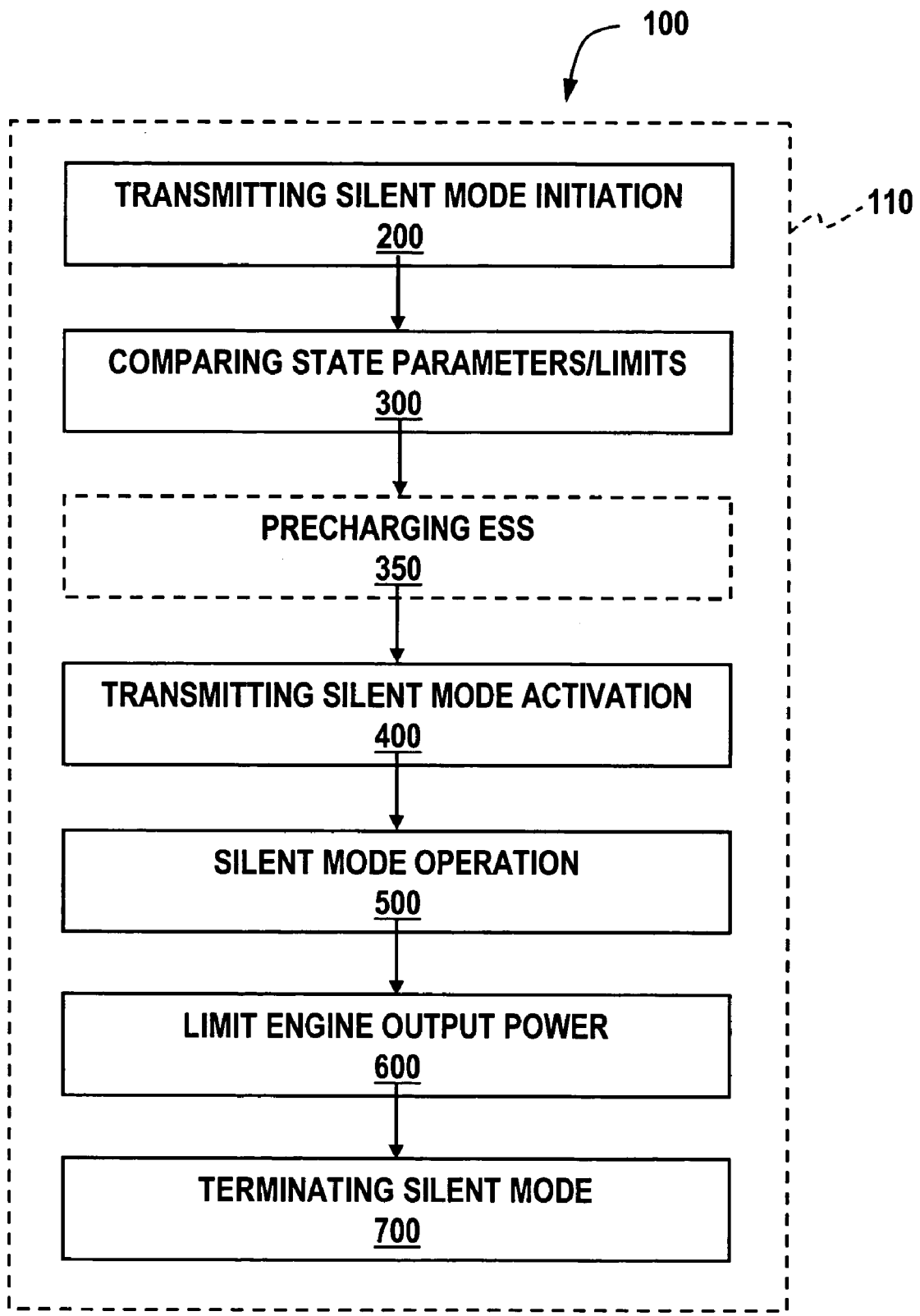
FIG. 4 is a block diagram illustrating steps of an embodiment of the method of the present invention.

Referring to FIG. 4, the present invention may be described generally as a method 100 of providing a silent mode 110 of operation for an HEV, such as an HEV comprising powertrain system 11, having a rechargeable energy storage system 20 (ESS), comprising the steps of: (1) transmitting 200 a silent mode initiation request to a silent mode controller 125; (2) comparing 300 an actual value of at least one state parameter of ESS 20 that is indicative of the availability of ESS 20 for implementing silent mode 110 to at least one silent mode initiation limit value associated with the actual value, wherein if the actual value of the at least one state parameter compared to the associated at least one mode initiation limit value indicates that silent mode 110 is allowed, method 100 proceeds to step (3), and wherein if the actual value of the at least one state parameter indicates that silent mode 110 is not allowed, step (2) is repeated so long as the silent mode initiation request is being transmitted; (3) transmitting 400 a silent mode activation request to silent mode controller 125; and (4) operating 500 the vehicle in silent mode 110 using silent mode controller 125, comprising designating the electric drive motor 143 as a primary source of propulsion energy for the vehicle and designating engine 145 as a secondary source of the propulsion energy for the vehicle, wherein a modal quantity of energy in ESS 20 is allocated for use by electric drive motor 143 during silent mode 110 and engine 145 is used to make up the difference between the modal quantity of energy and a total vehicle propulsion energy requirement during silent mode 110; (5) limiting 600 an output power of the engine while the vehicle is in the silent mode to a silent mode output power that is less than a maximum output power of the engine; and (6) terminating 700 silent mode 110 in response to the occurrence of mode termination event. These steps are described further below.

The first step of method 100 comprises transmitting 200 silent mode initiation request to silent mode controller 125. The silent mode initiation request may be transmitted by any suitable means, such as manual transmitting 200 of the silent mode initiation request by a vehicle operator, automatic transmitting 200 of silent mode initiation request as a function of an absolute position of the vehicle, and automatic transmitting 200 of the silent mode initiation request as a function of a relative position of the vehicle to a region in which silent mode operation of the vehicle is desired. Manual transmitting 200 of silent mode initiation request by a vehicle operator may be done by actuation of a switch, or making an appropriate selection from a user interface or graphic user interface, such as user interface (UI) 13 (see FIG. 1), that is in signal communication with silent mode controller 125. The transmitting 200 of silent mode initiation request may also be coupled to a suitable feedback indicator and associated implementation mechanism in order to provided an indication to the operator that the request has been made or is being processed by silent mode controller 125, such as incorporating an indicator light into or associated with the manual mode selector means, such as a lighted switch, or a display on UI 13 which indicates that mode initiation request has been made or is being processed. Automatic transmitting 200 of the silent mode initiation request as a function of an absolute position of the vehicle may be accomplished, for example, by automatically and continuously comparing an input signal that is indicative of the actual latitude and longitude position of the vehicle, such as a signal received from a global positioning satellite (GPS), with a set of latitude and longitude coordinates that identify a target zone or target zones, wherein a request for silent mode 110 operation is automatically transmitted 200 as an input signal to silent mode controller 125 if the comparison indicates that the vehicle is in a target zone. Such GPS signals may be monitored by GPS systems that are adapted to automatically and continuously receive such signals and provide an output signal indicative of an absolute latitude/longitude position of the vehicle which are known in the art, and such output signals may be automatically and continuously provided to silent mode controller 125. Automatic transmitting of the silent mode initiation request as a function of a relative position of the vehicle to a region in which silent mode operation of the vehicle is desired may be accomplished, for example, by incorporation of proximity sensors on the vehicle that are adapted to sense a signal associated with and proximate to a target zone. This could include, for example, use of an FM receiver on the vehicle that is adapted to receive an FM signal from a transmitter associated with a target zone, wherein the FM signal is indicative of the proximity of the vehicle to the target zone.

Referring again to FIG. 4, method 100 continues with the step of comparing 300 an actual value of at least one state parameter of ESS 20 that is indicative of the availability of ESS 20 for implementing silent mode 110 to at least one silent mode initiation limit value associated with the actual value, wherein if the actual value of the at least one state parameter compared to the associated at least one mode initiation limit value indicates that silent mode 110 is allowed, method 100 proceeds to the next step, and wherein if the actual value of the at least one state parameter indicates that silent mode 110 is not allowed, this test is repeated so long as silent mode initiation request is being transmitted to silent mode controller 125. As described above, state parameters of the ESS, such as battery or BPM 21, may comprise any parameters that are indicative of the availability of the ESS for use generally, and particularly for use in conjunction with implementation of silent mode 110, including parameters that provide information about either the short-term or long-term characteristics or condition of the ESS. These include the instantaneous battery temperature ($T_{BAT}$), the battery SOC and the average amp-hour per hour throughput of the battery (AH/H). The $T_{BAT}$ is an important parameter because both charging and discharging of the battery increase the battery temperature (e.g., under most conditions charging has the greater effect on temperature, but discharging also increases the battery temperature). As the battery temperature increases, the charging and discharging efficiency and the ability to obtain and maintain a desired SOC is affected. Further, overheating of the battery can also reduce its service life and available total amp-hour/hour throughput. The battery SOC is an important parameter because it provides an important indication of the total energy available in the battery, and its ability to provide charge to or accept charge from DPIM 19 and the other components of EVT 11. SOC is also important because high and low SOC conditions are associated with overvoltage and undervoltage conditions, respectively, both of which can damage the battery and reduce its service life. The integrated amp-hour/hour throughput is an important parameter because it is known to be directly related to the operational service life of the battery. The amp-hour per hour throughput of the ESS may be measured by integrating the ESS current over time using a predetermined filter and algorithm. Further details regarding amp-hour per hour throughput can be found in commonly assigned, co-pending U.S. Provisional Ser. No. 60/511,456 filed on Oct. 15, 2003, which is hereby incorporated herein by reference in its entirety. In a preferred embodiment, this step comprises comparing 300 $T_{BAT}$ to a silent mode initiation battery temperature limit value, wherein if $T_{BAT}$ is less than the mode initiation battery temperature limit value ($T_{SMI}$), the method proceeds to step (3), and wherein if $T_{BAT} \geq T_{SMI}$, this step is repeated so long as silent mode initiation request is being transmitted until the conditions necessary to proceed are satisfied.

Where ESS comprises a battery, if $T_{BAT} \leq T_{SMI}$, method 100 preferably also comprises a step (2A) of precharging 350 the battery 21 prior to initiation of silent mode 110. This is preferred in order to ensure that battery 21 has an SOC that is sufficient to supply the quantity of electrical energy necessary to implement method 100, as described herein. It is also preferred when precharging 350 that this step be limited to precharging the ESS to a state of charge (SOC) value that is less than or equal to a target precharge SOC limit. The purpose of this SOC precharging limit is to limit the temperature increase in the battery associated with charging. [0]Another purpose of the upper precharging SOC limit is to make for consistent charge times and to ensure that enough energy is in the ESS while not unnecessarily increasing the AH/H throughput or SOC swing of the ESS by driving the SOC higher than necessary to travel the target distance. There are also life considerations with how much and how quickly the SOC swings from minimum to maximum. One purpose behind the maximum SOC precharge limit is to keep the SOC high enough that if the silent mode uses the entire allocated budget, the minimum limit would not be exceeded. Because precharging 350 is done in anticipation of an immediate and possibly extended discharge from battery as silent mode 110 is initiated, and because discharge also causes additional heating of the battery, it is preferred that precharging be limited to an SOC that is less than or equal to target precharge SOC limit. The target precharge SOC limit will necessarily vary depending on the capacity, construction and configuration of battery 21 and other system design factors such the maximum battery power requirements associated with projected vehicle loads, target zone parameters and other factors, and may be expressed as a target value, minimum/maximum value or other similar method of identifying a limit value. For example, in one embodiment associated with BPM 21, where the length of the target zone was about 2.2 km, and the battery had a total capacity ($SOC_{100\%}$) of about 19 amp-hours, the target precharge SOC limit was about 60%, or 11.4 amp-hours. When the SOC of battery 21 reaches target precharge SOC limit, precharging 350 is complete and silent mode controller 125 stops precharging 350. Precharging 350 is also preferably terminated if silent mode 110 is initiated prior to the battery SOC reaching the target precharge SOC limit. It is preferred that precharging 350 comprises charging ESS 20 at a maximum charging power of the vehicle consistent with control of parametric ESS limits associated with ESS charge/discharge, SOC and temperature, such as those described in commonly assigned, co-pending U.S. Ser. No. 60/511,456. Further, during precharging 350 the vehicle is adapted to operate engine 145 at a combination of Ni and Ti that maximizes the charging power available to the ESS and which are generally consistent with other system requirements, such as the desired No and To. However, the step of precharging 350 may be adapted to select combinations of Ni and Ti that preferentially maximize the charge power to the ESS, even though such choices may constrain the possible values of No and To to values that are less than desired or commanded values. The method of determining combinations of Ni and Ti to affect the desired control of the EVT powertrain are described in commonly assigned, co-pending U.S. Ser. No. 10/686,508 filed on Oct. 14, 2003 and U.S. Ser. No. 10/686,034 filed on Oct. 14, 2003, which are hereby incorporated herein by reference in their entirety. When the desired target precharge SOC is reached during precharging 350, charging is preferably stopped and is not resumed unless vehicle operation requires a discharge that causes the SOC to drop below the target precharge SOC. Precharging 350 may also be scheduled for a particular duration of time, subject to parametric limits as described herein. The step of precharging 350 is preferred, but optional and not essential to the practice of method 100, since ESS 20 may comprise more than battery 21, as explained above, and because even when ESS consists of a battery, the control algorithms concerning SOC may be such that precharging 350 is not required prior to implementing method, such as HEVs in which other constraints require that the SOC always be maintained at a level that is sufficient to implement silent mode 110 without the need for precharging.

Referring to FIG. 4, following the steps of comparing 300 and any precharging 350, method 100 proceeds with the step (3) of transmitting 400 silent mode activation request using silent mode controller 125. Transmitting 400 may be accomplished in a manner analogous to the step of transmitting 200, in that silent mode 110 may be activated by transmitting 400 silent mode activation request to silent mode controller 125 by any suitable means, such as manually transmitting 400 silent mode activation request by a vehicle operator, automatically transmitting 400 silent mode activation request as a function of an absolute position of the vehicle, and automatically transmitting 400 silent mode activation request as a function of a position of the vehicle relative to a region in which silent mode operation of the vehicle is desired. Transmitting 400 of silent mode activation request may also be accomplished as a function of elapsed time or distance after transmitting 200 of silent mode initiation request, or initiation or completion of precharging 350.

Figure 6:
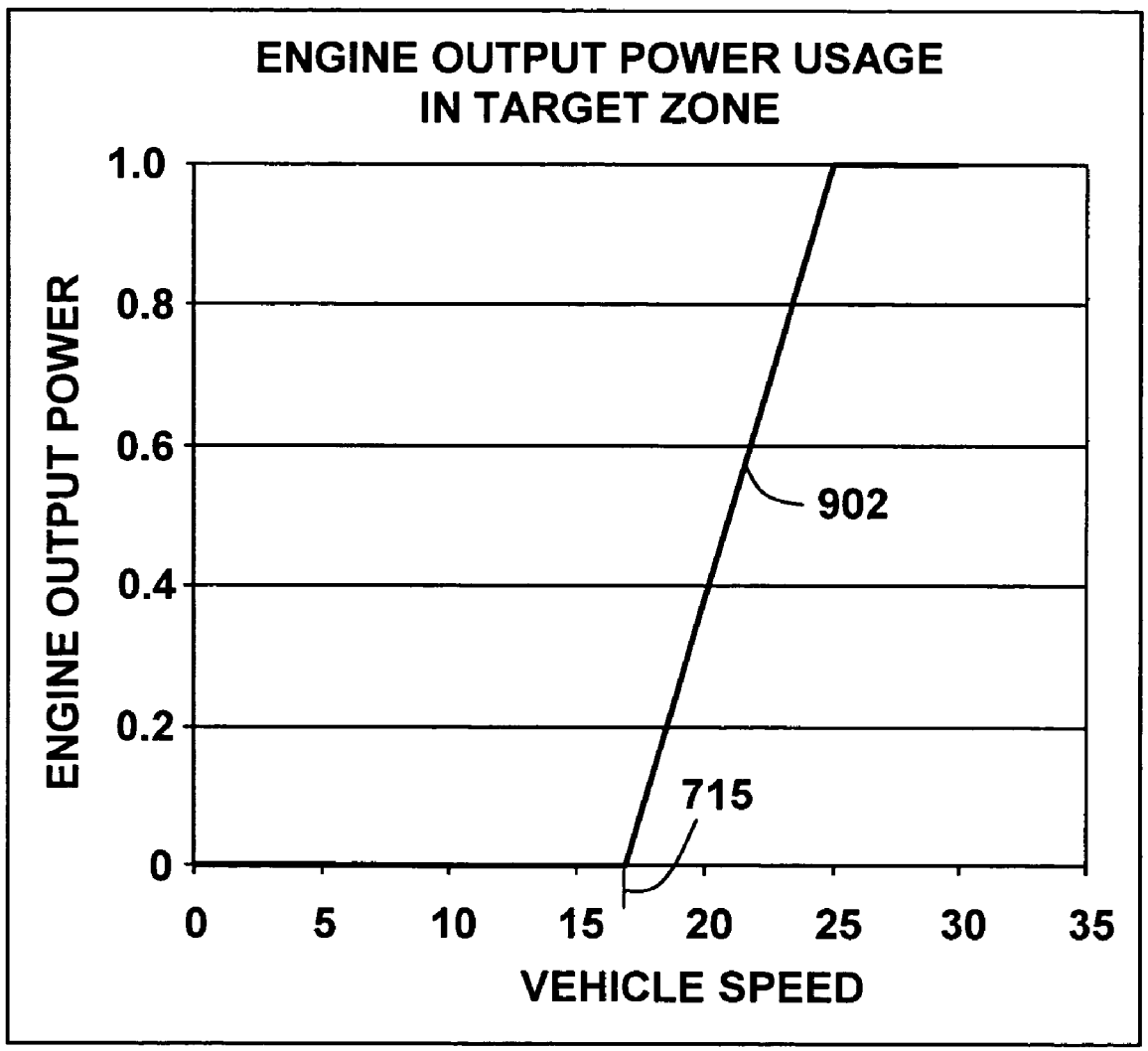
FIG. 6 is a plot of engine output power is a function of vehicle speed illustrating engine power usage in a target zone for the method of the present invention.

Referring to FIG. 4, following the steps of transmitting 400 of silent mode activation request, method 100 proceeds with step (4) of operating 500 the vehicle in silent mode 110 using silent mode controller 125, comprising designating an electric drive motor 143, such as motor A (56) or motor B (72), or both of them, as a primary source of propulsion energy for the vehicle and designating an engine 145, such as engine 14, as a secondary source of the propulsion energy for the vehicle, wherein a modal quantity of energy in ESS 20 is allocated for use by electric drive motor 143 during silent mode 110 and engine 145 is used to make up the difference between modal quantity of energy and the total vehicle propulsion energy requirement during silent mode 110. Engine 145 is secondary in that it is only used in order to make up the difference between the modal quantity of energy and the total vehicle propulsion energy requirement during silent mode 110, and if the modal quantity is sufficient, engine 145 is preferably not fueled and rotated by electric drive motor 143, such as motor A (56) or motor B (72). If engine 145 is required, it is only fueled so as to provide the necessary propulsion energy differential, rather than, for example, at its maximum rated capacity. This is illustrated in FIG. 6, which plots engine 145 output power as a function of vehicle speed for a particular point of consumption of the SOC allocated for silent mode 110 for illustration of an exemplary implementation of method 100. At a vehicle speeds below about 17 mph, there is no output power or energy contribution from engine 145. At vehicle speeds from 17 mph to about 24 mph, the propulsion energy contribution of engine 145 is increased at a constant rate to a maximum silent mode value at vehicle speeds above about 24 mph. The maximum engine output power while the vehicle is in silent mode 110 is limited to a maximum silent mode output power limit that is preferably selected to be less than a maximum output power of engine 145 in order to reduce noise and exhaust emissions in the target zone. A modal quantity of energy in the ESS 20 is allocated for use during silent mode 110. The modal quantity of energy may comprise any portion of the available SOC of the battery. However, in order to simplify implementation of method 100, it is preferred that the portion of the SOC allocated as modal quantity comprise a fixed portion or percentage of the maximum SOC, or maximum energy storage capacity of battery 21. For example, in the case of a battery 21 having a maximum energy storage capacity of 19 amp-hours, modal quantity of battery energy comprised 4.75 amp-hours, or about 25% of the maximum SOC. However, if precharging 350 does not provide the desired target precharge SOC value, or if the actual SOC level at the activation of the silent mode exceeds the target precharge SOC, method 100 may adapt the modal quantity of energy to adjust for the deficit or surplus, as further described herein.

Figure 5:
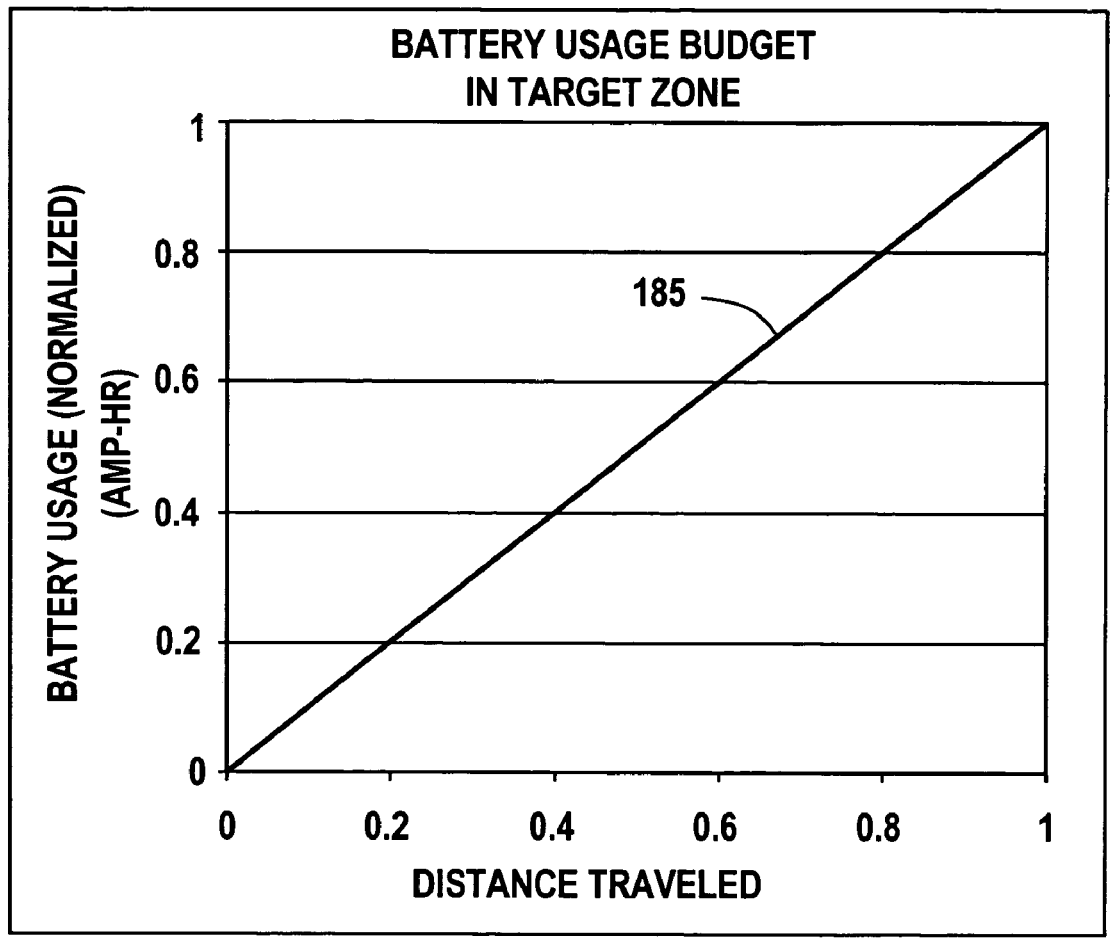
FIG. 5 is a plot of battery usage as a function of distance traveled in the target zone to illustrate a battery usage budget for the silent mode of the method the of present invention.

The modal quantity of energy may be allocated for use during silent mode 110 according to any suitable allocation scheme, but a preferred scheme is to establish or calculate an ESS usage budget 185 for use during silent mode 110, such as the one shown in FIG. 5, wherein the modal quantity of battery energy is normalized and allocated as a function of the total distance traveled, or length of the target zone. The budget may be linear or non-linear depending on variations associated with target zone along its length (e.g., extended stops, grade variations, etc.) vehicle load and other factors.

As the vehicle travels through the target zone, the actual usage of the modal quantity of battery energy deviates from the ESS usage budget. When deviations occur such that actual usage of the modal quantity of ESS propulsion energy is greater than the budgeted amount, engine 145 is used to supply the difference. The amount of engine output power necessary may be calculated as a function of vehicle speed and a speed/charge consumption dependent ESS budget factor (EBF) or battery budget factor. EBF provides an indication of how much the amount of ESS energy actually consumed as a function of distance in the target zone has deviated from the ESS usage budget established for the modal quantity of energy associated with that distance. The EBF is calculated as:

$$EBF = 1 - \frac{(\Delta SOC_{INSTANT} - \Delta SOC_{BUDGET})}{K}, \quad (1)$$

where:

$$\Delta SOC_{INSTANT} = SOC_{INITIAL} - SOC_{INSTANT}, \quad (2)$$

$$\Delta SOC_{BUDGET} = SOC_{BUDGET} - SOC_{INSTANT}, \quad (3)$$

and:

$SOC_{BUDGET}$=the amount of $SOC_{100\%}$ budgeted for use during the silent mode as a function of distance, in percent;

$SOC_{INITIAL}$=the SOC at the initiation of the silent mode, in percent;

$SOC_{INSTANT}$=the instantaneous SOC as a function of distance, in percent;

$SOC_{100\%}$=the total charge capacity of the battery; and

K=a constant for a given EVT powertrain, similar to a gain, and in an EVT 11 HEV, the value of K was preferably about 5.

Figure 7:
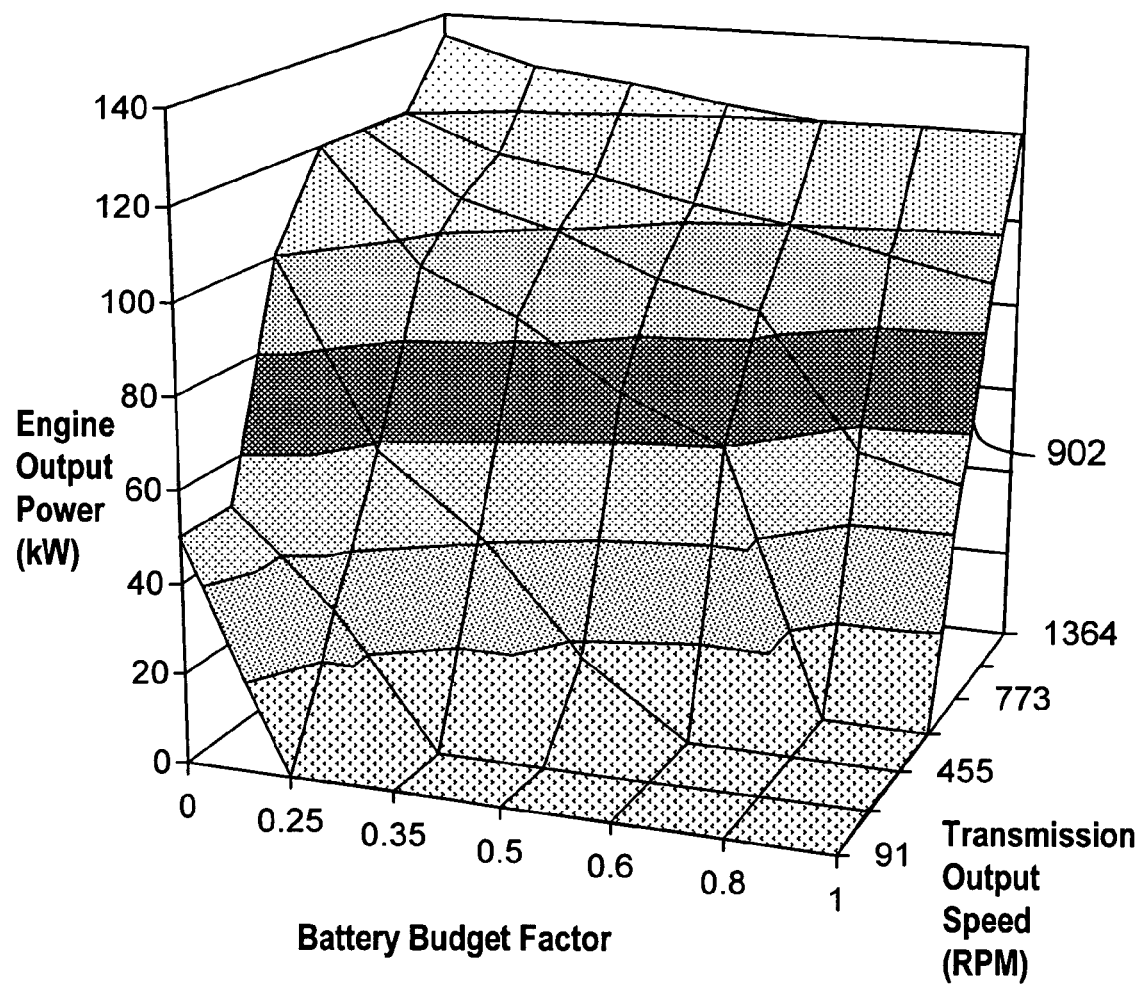
FIG. 7 is a plot of engine output power as a function of transmission output speed and a battery budget factor for the method of the present invention.

FIG. 7 illustrates a plot of engine output power as a function of EBF and the transmission output speed in revolutions per minute, which is directly related to the vehicle speed. In the illustrated embodiment, the transmission output speed (rpm) was related to vehicle speed (mph) by multiplying transmission output speed by a factor of 0.022. This relationship may be stored in a lookup table. The axes represent boundary conditions. At transmission output speeds above 1364 rpm, motor output power is constant as a function of vehicle speed and varies only modestly as a function of the battery budget factor. The battery budget factor is limited to 0 for values that are less than zero and 1 for values that are greater than 1. For negative vehicle speeds, the output power was limited to the values associated with zero vehicle speed. The value of EBF may be calculated by silent mode controller and vehicle output speed may be obtained from, for example, TCM 17. These may be used to look up the engine output power necessary to make up any differences between the budgeted amount of modal quantity of energy allocated for propulsion of the vehicle and the total vehicle propulsion energy requirement. The engine output power from the look up table is used by VCM 15 to affect control of engine 145 and supply the difference between the ESS budget amount and the total vehicle propulsion requirement based on the EBF.

As noted above, if the actual precharge SOC deviates from the target precharge SOC, either higher or lower, the ESS budget is preferably adjusted using a ESS budget adjustment factor (EBAF), which may be developed empirically or theoretically based upon the target precharge SOC and its desired design limits. In an exemplary embodiment, where the target precharge SOC was 60% and the modal quantity of energy was 25% of the maximum SOC, the EBAF was calculated as shown below:

$$EBAF = \frac{SOC_{INITIAL} - 30}{25}; \quad (4)$$

where EBAF was constrained to values in the range. 0.1≦EBAF≦1. The battery budget factor was multiplied by the EBAF to adjust the battery budget for deviations of $SOC_{INITIAL}$ from the target precharge SOC.

Referring to FIG. 4, in conjunction with the step of operating 500 the vehicle in silent mode 110, method 100 proceeds with a step (5) of limiting 600 an output power of the engine while the vehicle is in silent mode 110 to a silent mode output power that is less than a maximum output power of the engine. This limiting 600 of engine output power is central to the reduction of vehicle emissions, including noise and exhaust emissions, obtained through the implementation of silent mode 110, and may be implemented in the manner described in greater detail below.

Referring to FIG. 4, following the step of operating 500 the vehicle in silent mode 110, including limiting 600 engine output power, method 100 proceeds with step (6) comprising terminating 700 silent mode 110 in response to the occurrence of mode termination event. There are a plurality of mode termination events that may be selected from the group consisting of: (a) manual transmitting of a silent mode termination request by a vehicle operator, (b) automatic transmitting of a silent mode termination request as a function of the absolute position of the vehicle, (c) automatic transmitting of a silent mode termination request as a function of a relative position of the vehicle to a region in which silent mode operation of the vehicle is desired a manual mode termination command, (d) reaching a predetermined silent mode elapsed time limit, (e) reaching a predetermined silent mode elapsed distance limit, and (e) reaching at least one ESS state parameter termination limit. Mode termination events (a)-(c) are analogous to the corresponding events described above associated with transmitting mode initiation and mode activation requests, except that they are associated with exiting, rather than entering, a target zone, and may be performed in the manner described therein. Mode termination events (d) and (e) are particularly adapted for use when either an elapsed distance within the target zone or an elapsed time within target zone is known or can be characterized sufficiently such that an elapsed mode distance limit or an elapsed mode time limit, respectively, can be established for automatic termination of silent mode 110. The actual elapsed mode distance can be determined for comparison against the elapsed mode distance limit by measuring an odometer signal when silent mode 110 is initiated and periodically comparing it with an instantaneous odometer value in order to develop an actual elapsed mode distance value. Similarly, the actual elapsed mode time can be determined for comparison against the elapsed mode time limit by initiating a timer when silent mode 110 is initiated and periodically comparing the initial value with an instantaneous timer value in order to develop an actual elapsed mode time value. Mode termination events (f) comprises reaching at least one ESS state parameter termination limit. As described above, in the case where ESS comprises a battery, the state parameter may comprise a maximum battery temperature limit, wherein reaching the maximum limit temperature triggers the termination of silent mode. The limit temperature should be selected so as to protect the battery from conditions that could cause short term or long term damage. For example, in an embodiment where the ESS comprised a NiMH battery, a limit of 50° C. was selected. Similarly, in the case where ESS comprises a battery, the state parameter may comprise a minimum battery SOC limit, maximum battery SOC limit, or both, wherein reaching the limit SOC triggers the termination of silent mode. For example, in an embodiment comprising a NiMH battery, minimum/maximum SOC limits of $20\% \geqq SOC \geqq 90$ were selected.

Figure 8:
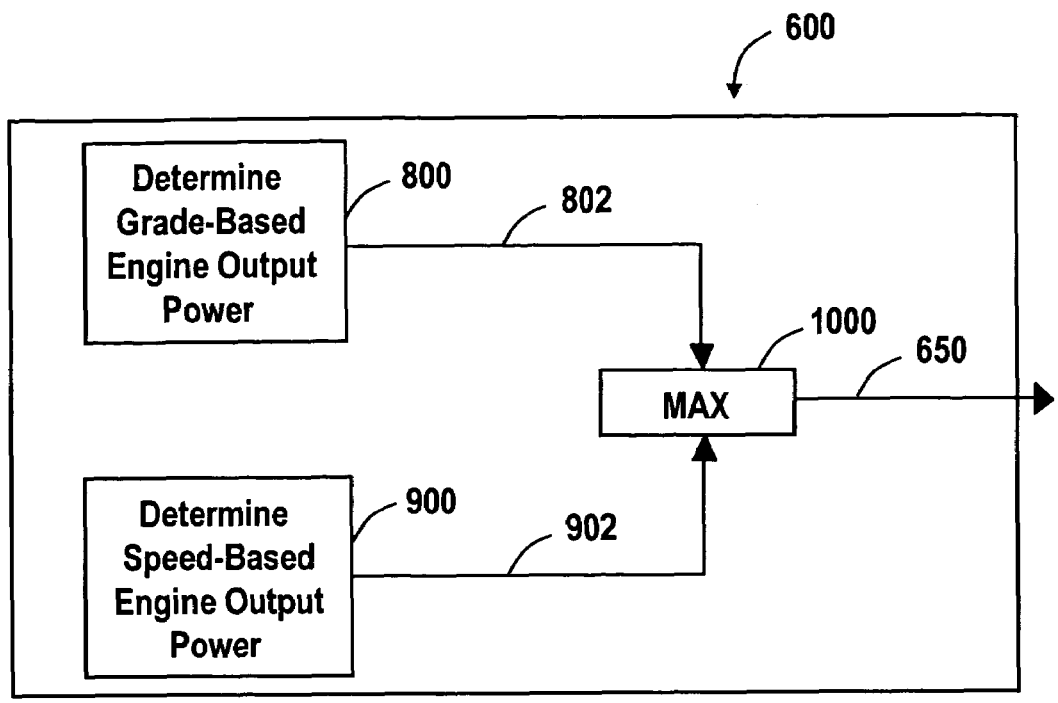
FIG. 8 is block diagram further illustrating block 600 of FIG. 4.

Referring to FIGS. 6-16, and the step of limiting 600 an output power of the engine while the vehicle is in silent mode 110 to a silent mode engine output power 650 that is less than a maximum output power of the engine, the silent mode output power may be determined as illustrated in FIG. 8 by the steps of determining 800 a grade-based engine output power 802 for the vehicle; determining 900 a speed-based engine output power 902, wherein the speed-based engine output power 902 is determined as a function of a speed of the vehicle; and selecting 1000 the silent mode output power 650 of the engine from the grade-based engine output power 802 and the speed-based engine output power 902. It is preferred that the step of selecting 1000 a silent mode output power 650 of the engine comprises choosing the greater of the grade-based engine output power 802 and the speed-based engine output power 902.

Referring to FIGS. 6-7, a detailed explanation of the step of determining 900 the speed-based engine output power 902 is described above. Additional information regarding the determination of the speed-based engine power may be found in U.S. Ser. No. 10/686,175. As described therein, the maximum speed-based silent mode output power 902 of engine 145 is automatically controlled as a function of vehicle speed and the battery budget factor. As vehicle speeds approach zero, the maximum silent mode output power of the engine is gradually reduced, until at relatively low vehicle speeds that are less than a vehicle stop threshold value 715, but greater than zero, the maximum silent mode engine output power becomes zero, except for very low values of the battery budget factor (i.e., situations where the consumption of the battery charge is significantly ahead of the budgeted amount), as illustrated in FIG. 7. The maximum speed-based silent mode engine output power 902 may be reduced by gradually defueling (gradually reducing the amount of fuel supplied per unit of time) engine 145. As the amount of fuel is reduced, the maximum speed-based silent mode engine output power 902 is also reduced, until at the vehicle stop threshold value 715, the fueling is stopped altogether and the maximum speed-based silent mode engine output power 902 becomes zero. For example, referring to FIG. 6, when EBF=1 (i.e., actual power consumption equals the budgeted amount), vehicle stop threshold value 715 is about 17 mph. Even though fueling is stopped at vehicle stop threshold value 715, the engine 145 is preferably rotated by one of the at least one electric drive motors 143. Rotation of the engine and members which are coupled to it improves the responsiveness of the overall EVT powertrain to engine restart requests and also permits common mechanical and/or hydraulic subsystems, such as transmission lubrication systems, to be powered even while the output power of the engine is zero without the need for expensive reengineering to provide their functionality while the engine is not rotating.

As used herein, the term grade or grade of a vehicle generally means the degree of inclination of the vehicle on a roadway or other surface over which the vehicle is traveling, The detection of the grade and changes in the grade are generally considered and explained herein with reference to forward travel of the vehicle, however, the invention and principles described herein may also be applied to reverse travel of the vehicle by make certain adjustments as would be apparent to one of ordinary skill. It is preferred that silent mode 110 also be adapted to detect and respond to changes in the grade of the route over which vehicle is operated while it is in silent, mode 110, specifically increases in the grade, because an increased grade or incline may cause significant deviations from the battery budget and effect performance in the mode because it results in slow vehicle speeds which may not otherwise call for any, or for increased engine output power. The grade, or changes in the grade, over which a vehicle is traveling may be determined or sensed directly using any of a number of well-known apparatus and methods for detecting or determining a grade or incline and its degree. However, use of such methods and/or apparatus would typically require the incorporation of the necessary additional apparatus in a vehicle and then integration with the various vehicle systems and controllers, as well as qualification testing and other in-vehicle testing. Therefore, it is preferred that the grade, or changes in the grade, over which the vehicle is traveling, particularly entry into or exit from a region of increased or increasing grade, be determined or detected indirectly from vehicle state parameters that may be readily obtained using existing vehicle systems and sensors. For a given vehicle, parametric limit values of various vehicle state parameters, or combinations thereof, including transmission output torque (To), output speed (No), output acceleration (No_dot) and a derivative of output torque, as well as the speed-based engine output power, can be developed empirically that are indicative of whether the vehicle is traveling over flat terrain, or whether the vehicle is entering or on an inclined grade, or whether it has exited such a region and has returned to flat terrain or a declining grade. With respect to the condition of the vehicle state parameters, travel of the vehicle over an inclined grade is characterized generally by high or increasing output torque, slow or slowing vehicle speed and low or slowing acceleration. Parametric limits in these values may be established, and incorporated into the silent mode controller such as by the use of a look up table or tables.

Applicants have determined that upon detection of a grade that exceeds parametric limits, electric-only propulsion power may not enough to accelerate the vehicle up a grade, and that it is desirable to command a grade-based engine output power (e.g., 100 kW) under such conditions that will insure that the total vehicle propulsion energy is sufficient, and which will also ensure that vehicle is operating in a range of output power wherein the silent mode control algorithm is effective to maintain proper control in view of the silent mode battery budget, and wherein the battery budget factor provides an accurate indication of the required output power as a function of vehicle speed. Depending on the method used to detect or determine the grade, it may also be possible to determine the degree of the grade, wherein it is believed that the magnitude of the grade-based engine output power 802 may also be determined as a function of a grade of the vehicle or the grade over which the vehicle is traveling.

Referring to FIG. 8, in one embodiment of the invention, it is believed that the grade-based engine power 802 may be described generally as being determined as a function of a grade of the vehicle, or a grade over which the vehicle is traveling which may be determined by direct measurement methods and apparatus, as described herein. On flat terrain, there is no need for a grade based contribution to engine output power, so the value of the grade-based engine output power is zero. For inclined grades above a calibration threshold, such as for example a slope threshold, the engine power may be set to a fixed grade-based output power as described above. Alternately, the grade-based output power may be varied as a function of the slope or degree of the grade.

Referring again to FIGS. 8-16, in a preferred embodiment of the invention, the grade-based engine power is a function of a vehicle state parameter. A vehicle state parameter may be any parameter of the vehicle which may be sensed, measured, calculated or otherwise derived or determined, or combinations thereof, and which may be utilized to provide indication of the grade on which the vehicle is operating, or a change in the grade on which the vehicle is operating. Vehicle state parameters are generally associated with the dynamic state of a vehicle. The vehicle state parameter may be merely indicative rather than determinative of a grade or a grade change. Currently-known vehicle state parameters include transmission output torque, a derivative of a transmission output torque, transmission output speed, and transmission output acceleration. Thus, the vehicle state parameter may be selected from a group consisting of these parameters. While detection of a grade or change in grade may be performed using a single vehicle state parameter, it is preferred to utilize a plurality of vehicle state parameters in various combinations in order to detect the presence of a grade or incline, or a change thereof, as described further herein.

Figure 10:
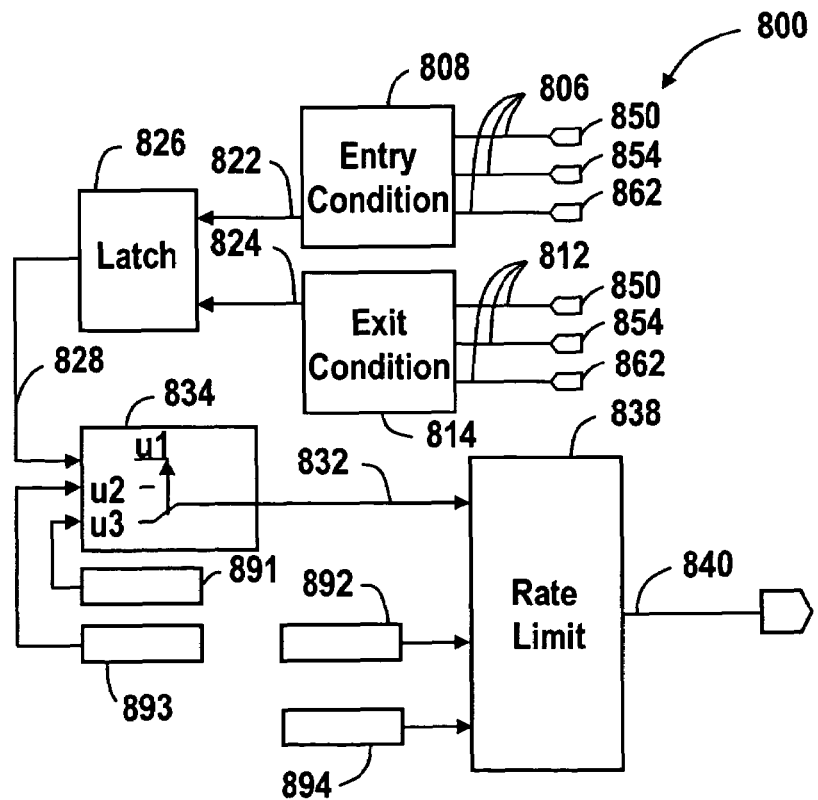
FIG. 10 is a block diagram illustrating one embodiment of a means for performing block 800 of FIG. 8.
Figure 9:
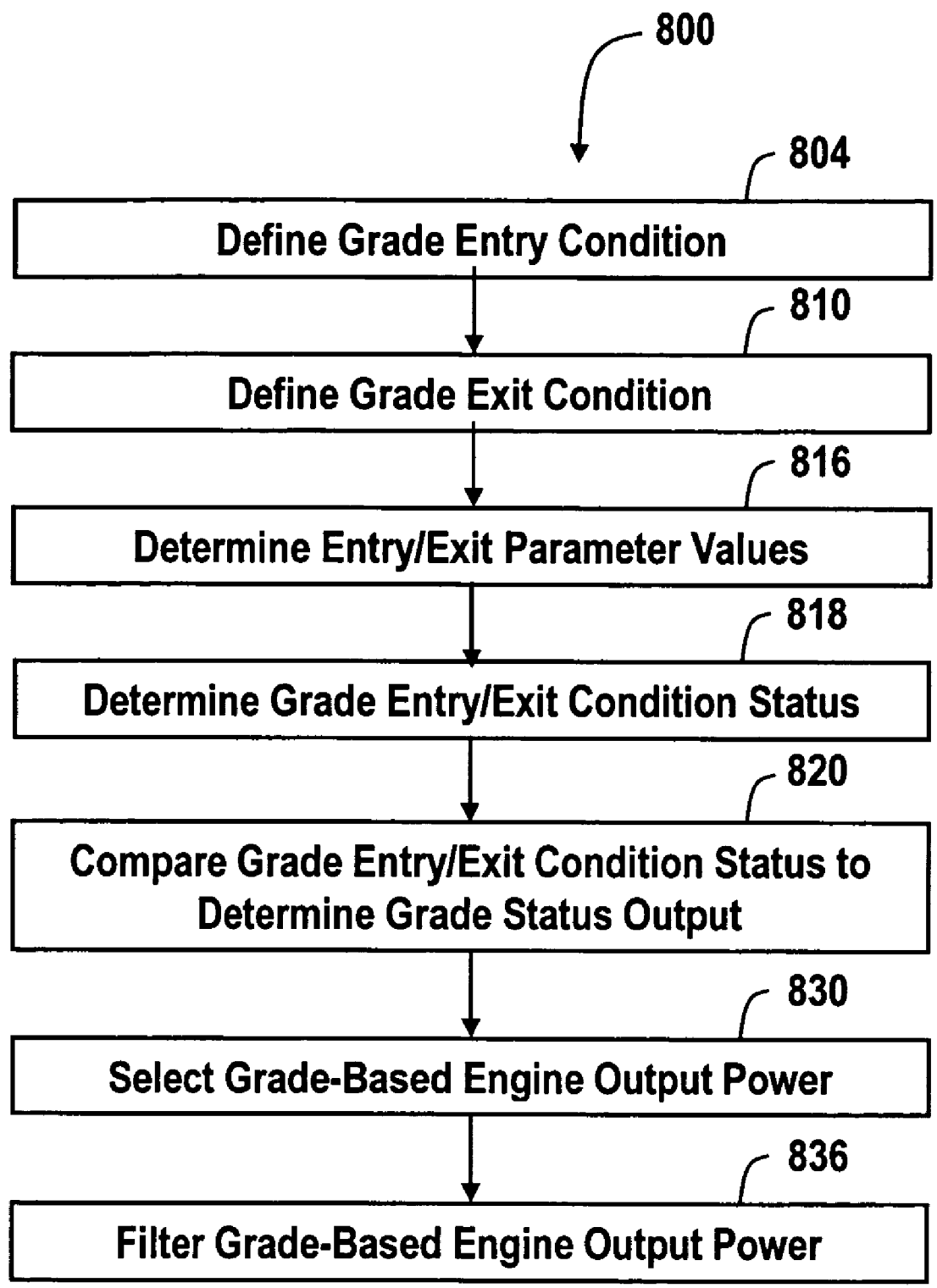
FIG. 9 is a flowchart illustrating additional steps of the method of the invention associated with block 800 of FIG. 8.

Referring to FIGS. 8-10, the step of determining 800 a grade-based engine output power 802 for the vehicle may be performed by the further steps, comprising: defining 804 a grade entry condition having a status which is either satisfied or not satisfied as a function of a grade entry vehicle state parameter 806 associated with a dynamic state of the vehicle as illustrated generally in block 808, wherein when the grade entry condition is satisfied it is indicative that the vehicle is on a grade; defining 810 a grade exit condition having a status which is either satisfied or not satisfied as a function of a grade exit vehicle state parameter 812 associated with the dynamic state of the vehicle as illustrated generally in block 814, wherein when the grade exit condition is satisfied it is indicative that the vehicle is not on a grade; determining 816 the values of the grade entry parameter 806 and the grade exit parameter 812; determining 818 the status of the grade entry condition and the grade exit condition; comparing 820 the grade entry condition status 822 and grade exit condition status 824 as illustrated generally in block 826 to determine a grade status output 828, wherein the grade status output 828 is indicative of whether the vehicle is on a grade or not on a grade; selecting 830 a grade-based output power 832 as a function of the grade status output 828 as illustrated in block 834. This also preferably includes a step of filtering 836 the grade-based output power as illustrated in block 838 to determine a filtered grade-based output power 840, which is preferred for use as grade-based output power 802. These steps are described further below.

Referring to FIG. 10, the step of defining 804 a grade entry condition having a status which is either satisfied or not satisfied as a function of a grade entry vehicle state parameter 806 associated with a dynamic state of the vehicle is illustrated generally in block 808. The grade entry condition is preferably defined as a plurality of conditional logic tests or statements designed for execution in the silent mode controller related to the grade entry parameter. While a single grade entry parameter may be utilized, it is preferred that the grade entry parameter is a plurality of grade entry parameters, comprising: an output torque/output acceleration entry parameter that is a function of the output torque and output acceleration, wherein if the output acceleration less than an output torque/output acceleration entry limit as a function of the output torque, the output torque/output acceleration entry parameter is satisfied; an output torque entry parameter, wherein if the output torque is greater than an output torque entry limit, the output torque entry parameter is satisfied; and an output torque derivative entry parameter, wherein if the output torque derivative is less than an output torque derivative entry limit, the output torque derivative parameter is satisfied. These parameters are explained further below.

The output torque/output acceleration entry parameter requires that the vehicle acceleration represented by the acceleration of the transmission output is less than a specific value that is a function of the transmission output torque. The premise behind this criterion or parameter is Newton's law, which states that the sum of the forces equals the mass times the acceleration. For rotational motion, this becomes the sum of the torques equals the rotational inertia times the rotational acceleration. On level ground, less torque is required to accelerate the vehicle than that which is necessary to accelerate the vehicle on a grade. This criterion effectively examines the vehicle output torque and compares this torque with the vehicle acceleration. If the vehicle output torque is high and the acceleration is low, the conclusion is that the vehicle must be on a grade, and that the grade-based engine output power should be provided.

Figure 11:
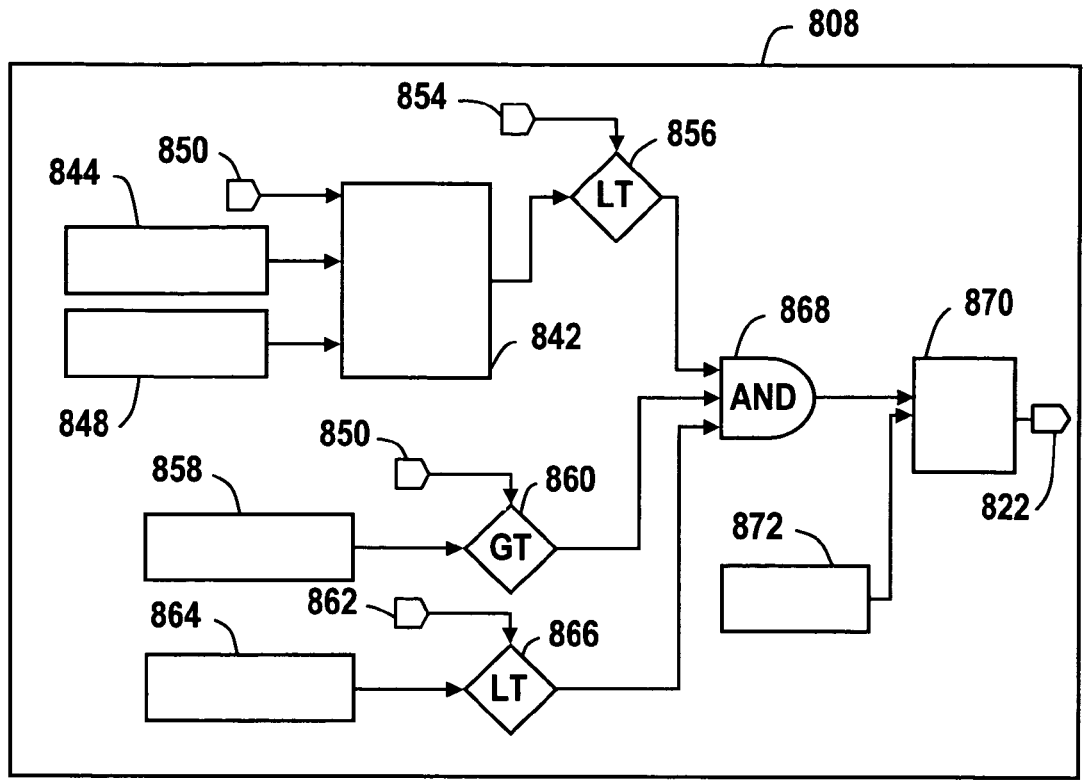
FIG. 11 is a block diagram of block 808 of FIG. 10.
Figure 12:
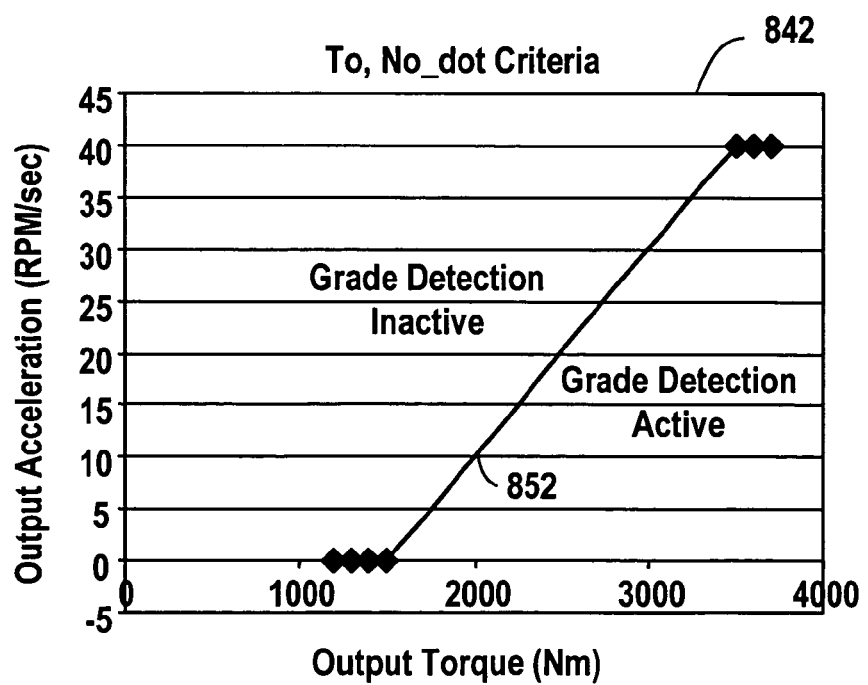
FIG. 12 is a graph of the information of block 842 of FIG. 11.

Referring to FIGS. 11 and 12, this comparison is accomplished using an interpolation table as illustrated in block 842 of FIG. 11 and the graph of FIG. 12. The calibrations comprehend the x-axis or To values of the To-No_dot interpolation lookup table as illustrated in block 844 and the y-axis or No_dot values of the To-No_dot interpolation lookup table as illustrated in block 848, and were determined by analyzing empirical data collected from vehicles launching on flat ground and operating on various types of grades. These are calibrations are input into the interpolation table together with a current value of To 850 associated with the control loop to permit the output torque/output acceleration entry limit value 852 of output acceleration associated with To 850 to be interpolated, as illustrated in FIG. 11. The current value of No_dot 854 associated with the control loop is compared with the value of the output torque/output acceleration entry limit value 852, as illustrated in block 856. If the No_dot 854 input is less than or equal to the value of the output torque/output acceleration entry limit value 852 associated with the To 850 input, the output torque/output acceleration entry parameter is satisfied or true, otherwise, the parameter is not satisfied or false. It is preferred that To 850 input is a filtered input, using well-known techniques for filtering this input.

Referring to FIG. 11, the output torque entry parameter is a criterion which requires that To 850 input is greater than a calibration value or output torque entry limit 858, as illustrated in block 860. The purpose of this criterion is to provide protection against false activation of the grade mode during vehicle launch on flat terrain. Due to time lags which may occur in the control system depending on its configuration, the output torque/output acceleration entry parameter alone can, under some conditions, misidentify a vehicle launch for operation on a grade. Therefore, the output torque entry parameter is also utilized in conjunction with the output torque/output acceleration entry parameter to prevent such misdetections of a grade. The calibration is selected such that most launches in stations on flat ground do not result in an output torque value greater than the calibration value. Therefore, if the output torque is greater than an output torque entry limit, the output torque entry parameter is satisfied or true.

Referring again to FIG. 11, the output torque derivative entry parameter is a criterion which requires that the absolute value of the derivative of the vehicle output torque 862 is less than a calibration value or output torque derivative entry limit 864, as illustrated in block 866. This criterion is also included to minimize the potential of false activation of the grade mode during transient events such as vehicle launches. On a launch, the operator typically steps quickly into the accelerator pedal resulting in a significant change in the output torque. Examining the derivative of the vehicle output torque and requiring this value to be less than a calibration keeps grade detection from being activated by these transient activities.

Typically, the activation of grade mode is not extremely timing critical. It is more desirable to have some delay in the activation of the grade-based engine output power than it is to have false activation, such as when on level ground in a station in the case of a bus. A delay in activation of grade mode results in a slightly longer time of reduced acceleration. A false detection of grade on level ground, such as in a station would result in the engine being started causing undesirable emissions and noise in the station environment. Therefore, if the absolute value of the output torque derivative 862 is less than the output torque derivative entry limit 864, the output torque derivative entry parameter is satisfied or true.

Referring again to FIG. 11, the outputs of the torque/output acceleration entry parameter, the output torque entry parameter, output torque derivative entry parameter are passed to AND block 868. If all are satisfied or true, the grade entry condition is satisfied or true; otherwise, the condition is not satisfied or false. The output 822 of the grade entry condition is passed to block 826. While the grade entry output 822 may be used immediately, it is preferred that the condition be tested as illustrated in block 870 for a time period comprising predetermined grade entry interval 872, which may simply be established as a calibratable value. The value may be any suitable value depending on the desired vehicle performance, such as for example 100 ms. If the condition is satisfied or true for predetermined grade entry interval 872, it is passed as grade entry output 822 to block 826, otherwise, the appropriate false condition is passed to block 826.

Referring to FIG. 10, the step of defining 810 a grade exit condition having a status which is either satisfied or not satisfied as a function of a grade exit vehicle state parameter 812 associated with the dynamic state of the vehicle is illustrated generally in block 814. The grade exit condition is preferably defined as a plurality of conditional logic tests or statements designed for execution in the silent mode controller related to the grade exit parameter. While a single grade exit parameter may be utilized, it is preferred that the grade exit parameter is a plurality of grade exit parameters, comprising: an output torque exit parameter that is a function of the output torque, wherein if the output torque less than an output torque exit limit, the output torque exit parameter is satisfied; an output speed exit parameter, wherein if the output speed is less than an output speed exit limit, the output speed exit parameter is satisfied; and an output power exit parameter, wherein if a current value of the speed-based output power is greater than a current value of the grade-based output power, the output power exit parameter is satisfied.

Figure 13:
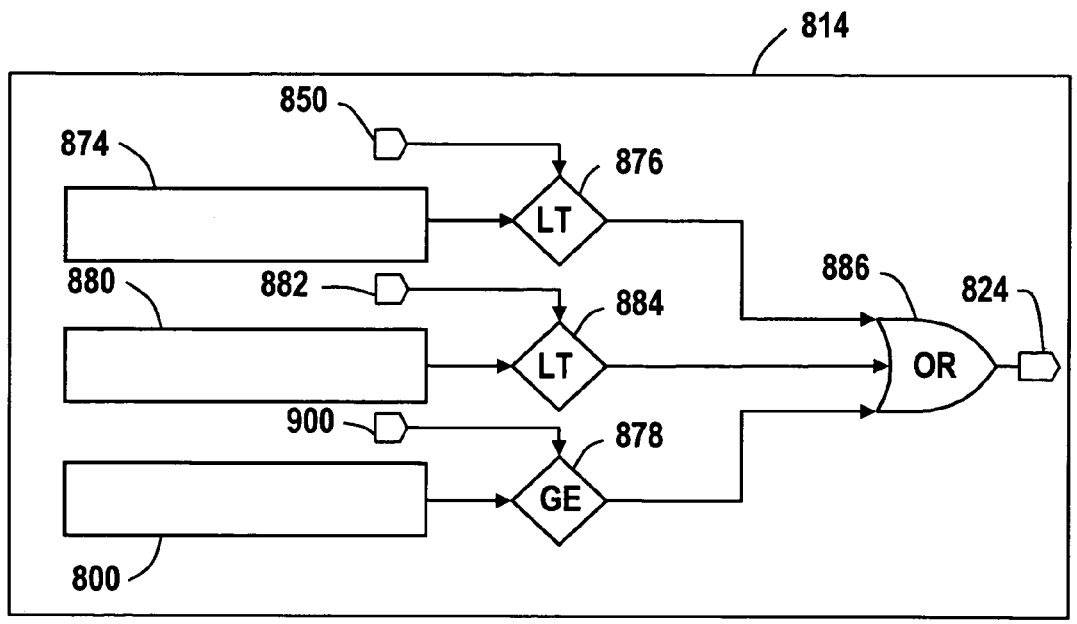
FIG. 13 is a block diagram of block 814 of FIG. 10.

Referring to FIG. 13, for the output torque exit parameter or criterion, if the To 850 input is less than an output torque exit limit 874 or calibration, as illustrated in block 876, the output torque exit parameter will be satisfied or true, the algorithm will indicate a grade exit condition, and grade detection will effectively be deactivated. This parameter provides hysteresis to the output torque magnitude entry parameter. Analysis of empirical vehicle data showed that at the end of a grade climb, the operator would typically reduce the output torque request to maintain a consistent vehicle speed when transitioning from the grade to the level ground, since less output torque is required for the same speed on level ground than is needed on a grade. This characteristic drop in output torque is the basis for this exit condition. The calibration value was selected by analyzing empirical vehicle data and selecting an output torque value such that a majority of the output torque drops would be detected.

Referring again to FIG. 13, for the output power exit parameter or criterion, when the desired engine power 900 from the normal HUSH mode operation algorithm which is the speed-based engine output power is greater than the grade-based engine output power 800 currently being commanded by the grade detection mode (i.e., a value from a prior control loop), as illustrated in block 878, the algorithm will indicate a grade exit condition, the output power exit parameter will be satisfied or true and grade detection will effectively be deactivated. When normal HUSH mode engine power as determined by the speed table shown in FIG. 6 is greater than the grade mode desired engine power, it is known that the vehicle has attained a high enough speed that the normal silent mode can sustain the required output torque. This is the dominant exit criterion from the grade mode. Once normal silent mode engine output power can sustain the desired vehicle performance, the grade-based engine output power can be deactivated.

Referring again to FIG. 13, another grade exit parameter may be utilized. For the output speed exit parameter or criterion, if the output speed, No 880, is less than an output speed exit limit 882 or calibration value, as illustrated in block 884, the output speed exit parameter will be satisfied or true and grade detection will effectively be deactivated. This criterion provides an addition exit condition for a vehicle entering a station. However, continued investigation demonstrated that this criterion may prevent grade mode from triggering when launching the vehicle on a grade until the vehicle exceeded this speed. Additionally, it was found that this was not the dominant exit criterion. Normally, one of the other criteria would deactivate grade mode prior to the speed criterion. Therefore, under certain conditions the calibration for this parameter may be selected to be a negative speed, so as to effectively turn the parameter off.

Referring again to FIG. 13, the outputs of the output torque exit parameter, the output power exit parameter, and optionally the output speed exit parameter are passed to OR block 886. If any are satisfied or true, the grade exit condition is satisfied or true; otherwise, the condition is not satisfied or false. The output 824 of the grade exit condition is passed to block 826.

Referring to FIG. 9, the step of determining 816 the values of the grade entry parameter 806 and the grade exit parameter 812 and determining 818 the status of the grade entry condition and the grade exit condition may be performed as described above.

Figure 14:
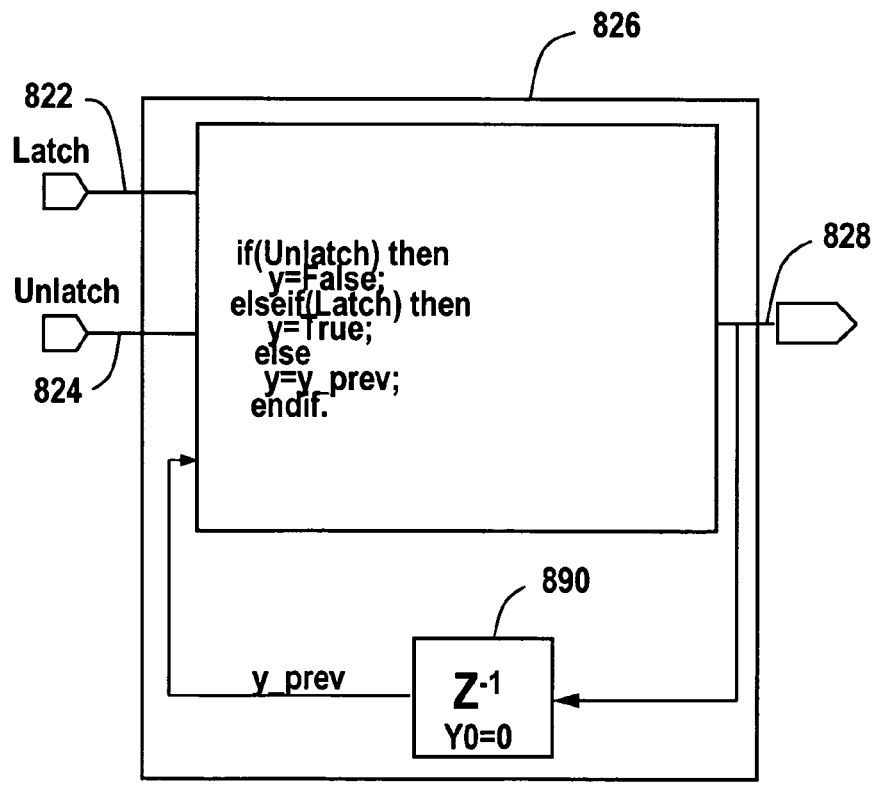
FIG. 14 is a block diagram of block 826 of FIG. 10.
Figures 15, 16:
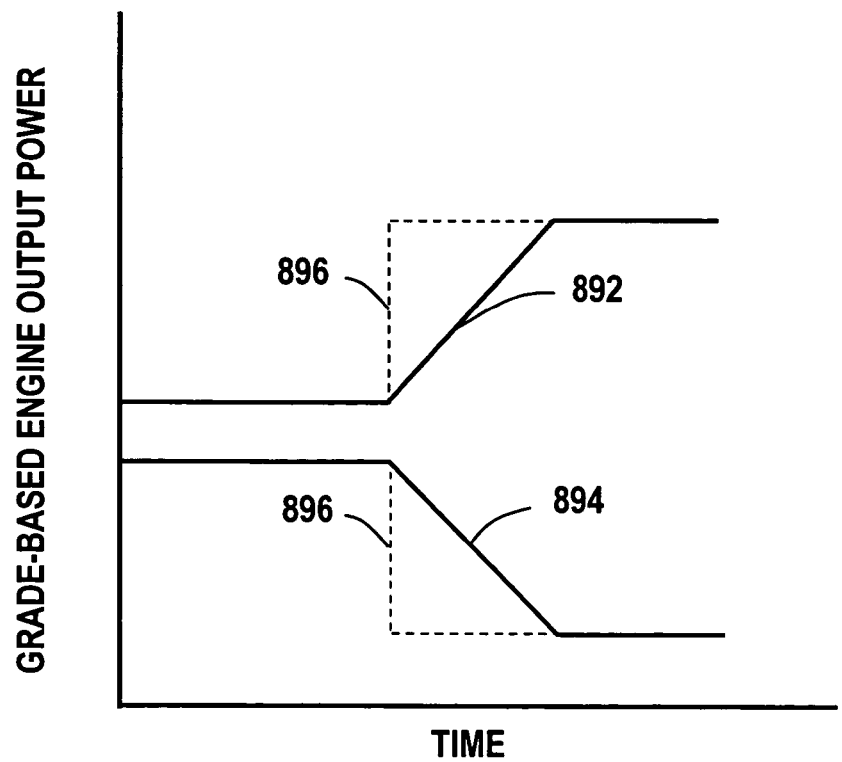
FIG. 15 is a table illustrating the operation of latch 826.
FIG. 16 is a plot of grade-based engine output power as a function of time and the operation of block 838.

Referring to FIGS. 9, 10, 14 and 15, the step of comparing 820 the grade entry condition status 822 and grade exit condition status 824 to determine a grade status output 828 is illustrated generally in block 826, wherein the grade status output 828 is indicative of whether the vehicle is on a grade or not on a grade. One means for performing the step of comparing 820 is a logic latch 826 having a latch input and an unlatch input, wherein the latch input is associated with the grade entry condition output 822 and the unlatch input is associated with the grade exit condition output 824, as shown in FIGS. 10, 14 and 15. It is preferred that the logic latch is an unlatch priority latch 826 as shown in FIGS. 14 and 15. Whenever the unlatch input signal is true, the latch becomes unlatched and the grade status output 828 is false. If the unlatch signal is false and the latch signal is true, the latch becomes latched and the grade status output 828 is true. If neither signal is true, the latch retains the previous value. The $Z^{-1}$ block 890 is a unit delay block that holds the value from the previous loop. The truth table for the latch 826 is shown in FIG. 15.

Referring to FIG. 10, the step of selecting 830 a grade-based output power 802 as a function of the grade status output 828 is illustrated in block 834. Selecting is preferably accomplished using a logic switch. The output of the switch block 834, shown in FIG. 10, depends on the first input, designated as u1. If the first input, u1, is true, the output, y, is equal to the second input, u2. The value of u2 is supplied by calibration 891. If the first input, u1, is false, the output, y, is equal to the third input, u3. The value of u3 is supplied by calibration 893. In the grade detection algorithm, when the grade mode latch is true and entry onto an inclined grade is indicated, the grade detection algorithm uses the switch to select the calibration that represents a desired grade-based engine output power. If the latch is false, such as if grade entry is not indicated or if grade exit is indicated, the switch is used to select a grade-based engine output power of zero indicating that no engine power is needed insofar as the detection of a grade is concerned.

Referring to FIG. 10, method 800 also preferably includes a step of filtering 836 the grade-based output power as illustrated in block 838 to determine a filtered grade-based output power 840, which is preferred for use as grade-based output power 802. The filter is intended limit the time rate of change of the input signal. The filter preferably includes independent control of both the rising rate and dropping rate of the input signal. The filter may comprise a rate limiter or any other suitable filter, including well-known first order filters. In one embodiment, filter 838 may comprise a rate limiter having an upper or rising rate limit 892 and a lower or falling rate limit 894. In the grade detection algorithm, when the latch 826 activates, the output of the switch block is a step change from zero grade-based engine output power to the desired grade-based engine output power. To keep this step change in desired power from being communicated directly to the engine and producing unpleasing sound and drivability, the rate limiter block limits the time rate of change of the desired engine power signal to a more desirable change, as illustrated in FIG. 15.

Further scope of applicability of the present invention will become apparent from the drawings and this detailed description, as well as the following claims. However, it should be understood that the detailed description and specific examples, while indicating preferred embodiments of the invention, are given by way of illustration only, since various changes and modifications within the spirit and scope of the invention will become apparent to those skilled in the art.

The invention claimed is:

1. A method of determining within a hybrid electric powertrain control strategy an engine output power for a vehicle, comprising:
   determining a grade-based engine output power for the vehicle having grade entry and grade exit conditions;
   determining a speed-based engine output power for the vehicle, wherein the speed-based engine output power is determined as a function of a speed of the vehicle and a battery budget factor;
   selecting the engine output power for propulsion of the vehicle as the greater of the grade-based engine output power and the speed-based engine output power; and
   controlling the hybrid electric powertrain in accordance with the selected engine output power.

2. The method of claim 1, wherein determining the grade-based engine output power for the vehicle, further comprises:
   defining the grade entry condition having a status which is either satisfied or not satisfied as a function of a grade entry parameter associated with a dynamic state of the vehicle, wherein when the grade entry condition is satisfied it is indicative that the vehicle is on a grade;
   defining the grade exit condition having a status which is either satisfied or not satisfied as a function of a grade exit parameter associated with the dynamic state of the vehicle, wherein when the grade exit condition is satisfied it is indicative that the vehicle is not on a grade;
   determining the values of the grade entry parameter and the grade exit parameter;
   determining the status of the grade entry condition and the grade exit condition;
   comparing the grade entry condition status and grade exit condition status to determine a grade status output, wherein the grade status output is indicative of whether the vehicle is on a grade or not on a grade; and selecting a grade-based engine output power as a function of the grade status output.

3. The method of claim 2, wherein the step of comparing is performed using a logic latch having a latch input and an unlatch input, wherein the latch input is associated with the grade entry condition and the unlatch input is associated with the grade exit condition.

4. The method of claim 1, wherein the grade-based engine output power is determined as a function of a vehicle state parameter.

5. The method of claim 4, wherein the vehicle state parameter is selected from a group consisting of a transmission output torque, a derivative of a transmission output torque, a transmission output speed, a transmission output acceleration and an engine output power.

6. The method of claim 3, wherein the logic latch is an unlatch priority latch.

7. The method of claim 2, further comprising:
filtering the grade-based engine output power to determine a filtered grade-based engine output power, wherein selecting the output power of the engine is performed by selecting from the filtered grade-based engine output power and the speed-based engine output power.

8. The method of claim 7, wherein the filter comprises an upper rate limit that is applied when the grade-based engine output power is increasing and a lower rate limit that is applied when the grade-based engine output power is decreasing.

9. The method of claim 2, wherein the grade entry condition is satisfied if the grade-entry parameter is satisfied and remains satisfied for a predetermined grade entry interval.

10. The method of claim 9, wherein the grade entry parameter is a plurality of grade entry parameters, comprising:
an output torque/output acceleration entry parameter that is a function of an output torque and an output acceleration, wherein if the output acceleration less than an output torque/output acceleration entry limit as a function of the output torque, the output torque/output acceleration entry parameter is satisfied;
an output torque entry parameter, wherein if the output torque is greater than an output torque entry limit, the output torque entry parameter is satisfied; and
an output torque derivative entry parameter, wherein if the absolute value of the output torque derivative is less than an output torque derivative entry limit, the output torque derivative parameter is satisfied.

11. The method of claim 2, wherein the grade exit parameter is a plurality of grade exit parameters, comprising:
an output torque exit parameter that is a function of the output torque, wherein if the output torque less than an output torque exit limit, the output torque exit parameter is satisfied; and
an output power exit parameter, wherein if a current value of the speed-based engine output power is greater than a current value of the grade-based engine output power, the output power exit parameter is satisfied.

12. The method of claim 11, further comprising:
an output speed exit parameter, wherein if the output speed is less than an output speed exit limit, the output speed exit parameter is satisfied.

13. A method of determining an engine output power for a vehicle powertrain system comprising an internal combustion engine, an electric machine that is operatively coupled to an energy storage system that is adapted to receive electric power from and provide electric power to the electric machine, and a transmission that is operatively coupled to the electric machine and the engine and adapted to transmit power received from one or both of them, and that is adapted for operation in a silent mode in which it is preferred that the primary power to transmission be received from the electric machine and in which the engine output power is limited to a value that is substantially less than a maximum output power of the engine, the method implemented as a computer control algorithm in a vehicle controller, comprising:

determining a grade-based engine output power for the vehicle having grade entry and grade exit conditions;

determining a speed-based engine output power for the vehicle, wherein the speed-based engine output power is determined as a function of a speed of the vehicle and a battery budget factor; and selecting the output power for propulsion of the vehicle as the greater of the grade-based engine output power and the speed-based engine output power.

14. The method of claim 13, wherein determining the grade-based engine output power for the vehicle, further comprises:
defining the grade entry condition having a status which is either satisfied or not satisfied as a function of a grade entry parameter associated with a dynamic state of the vehicle, wherein when the grade entry condition is satisfied it is indicative that the vehicle is on a grade;

defining the grade exit condition having a status which is either satisfied or not satisfied as a function of a grade exit parameter associated with the dynamic state of the vehicle, wherein when the grade exit condition is satisfied it is indicative that the vehicle is not on a grade;

determining the values of the grade entry parameter and the grade exit parameter;

determining the status of the grade entry condition and the grade exit condition;

comparing the grade entry condition status and grade exit condition status to determine a grade status output, wherein the grade status output is indicative of whether the vehicle is on a grade or not on a grade; and selecting a grade-based engine output power as a function of the grade status output.

15. The method of claim 14, wherein the step of comparing is performed using a logic latch having a latch input and an unlatch input, wherein the latch input is associated with the grade entry condition and the unlatch input is associated with the grade exit condition.

16. The method of claim 15, wherein the logic latch is an unlatch priority latch.

17. The method of claim 14 wherein the grade exit parameter is a plurality of grade exit parameters, comprising:
an output torque exit parameter that is a function of the output torque, wherein if the output torque less than an output torque exit limit, the output torque exit parameter is satisfied; and
an output power exit parameter, wherein if a current value of the speed-based engine output power is greater than a current value of the grade-based engine output power, the output power exit parameter is satisfied.

18. The method of claim 13, wherein the grade-based engine output power is determined as a function of a vehicle state parameter.

19. The method of claim 18, wherein the vehicle state parameter is selected from a group consisting of a transmission output torque, a derivative of a transmission output torque, a transmission output speed, a transmission output acceleration and an engine output power.

20. The method of claim 17, further comprising:
an output speed exit parameter, wherein if the output speed is less than an output speed exit limit, the output speed exit parameter is satisfied.

21. The method of claim 14, further comprising:
applying a rate limit to the grade-based engine output power to determine a rate limited grade-based engine output power, wherein selecting the output power of the engine is performed by selecting from the rate limited grade-based engine output power and the speed-based engine output power.

22. The method of claim 21, wherein the rate limit comprises an upper rate limit that is applied when the grade-based engine output power is increasing and a lower rate limit that is applied when the grade-based engine output power is decreasing.

23. The method of claim 14, wherein the grade entry condition is satisfied if the grade-entry parameter is satisfied and remains satisfied for a predetermined grade entry interval.

24. The method of claim 23, wherein the grade entry parameter is a plurality of grade entry parameters, comprising:
an output torque/output acceleration entry parameter that is a function of an output torque and an output acceleration, wherein if the output acceleration less than an output torque/output acceleration entry limit as a function of the output torque, the output torque/output acceleration entry parameter is satisfied, an output torque entry parameter, wherein if the output torque is greater than an output torque entry limit, the output torque entry parameter is satisfied; and an output torque derivative entry parameter, wherein if the absolute value of the output torque derivative is less than an output torque derivative entry limit, the output torque derivative parameter is satisfied.

* * * * *